United States Patent
Li et al.

(10) Patent No.: US 11,133,856 B2
(45) Date of Patent: Sep. 28, 2021

(54) BEAMFORMING TRAINING METHOD AND APPARATUS

(71) Applicant: Huawei Technologies Co., Ltd., Shenzhen (CN)

(72) Inventors: Yanchun Li, Boulogne Billancourt (FR); Mengyao Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 16/735,038

(22) Filed: Jan. 6, 2020

(65) Prior Publication Data

US 2020/0145087 A1    May 7, 2020

Related U.S. Application Data

(63) Continuation of application No. PCT/CN2018/094753, filed on Jul. 6, 2018.

(30) Foreign Application Priority Data

Jul. 7, 2017    (CN) .......................... 201710553107.2

(51) Int. Cl.
*H04W 4/00*    (2018.01)
*H04B 7/06*    (2006.01)
(Continued)

(52) U.S. Cl.
CPC ......... *H04B 7/0695* (2013.01); *H04B 7/0491* (2013.01); *H04B 7/0617* (2013.01); *H04B 7/0684* (2013.01); *H04B 7/088* (2013.01)

(58) Field of Classification Search
CPC .... H04B 7/0408; H04B 7/0491; H04B 7/061; H04B 7/0617; H04B 7/063; H04B 7/0684; H04B 7/0695; H04B 7/088; H04W 16/28

See application file for complete search history.

(56) References Cited

U.S. PATENT DOCUMENTS 10,056,958 B2    8/2018    Rajagopal et al.
10,075,023 B2    9/2018    Nishioka
(Continued)

FOREIGN PATENT DOCUMENTS

CN    102017442 A    4/2011
CN    105052199 A    11/2015
(Continued)

OTHER PUBLICATIONS

IEEE P802.11ay/D0.1,Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz. Jan. 2017, 181 pages.

*Primary Examiner* — Minh Trang T Nguyen
(74) *Attorney, Agent, or Firm* — Slater Matsil, LLP

(57) ABSTRACT

In an ISS process, the initiator sends a first SSW frame in different sector directions by sequentially using an antenna in m antennas, where m is not less than 1 and is less than or equal to N; and in an RSS process, the initiator receives a second SSW frame in a parallel (e.g., simultaneous) omni-directional manner by using M antennas, where the second SSW frame is sent by a responder in different sector directions, each second SSW frame carries information used to indicate a first SSW frame with best quality in the ISS process, and the M antennas include at least the m antennas, and determines an optimal transmit beam in the ISS process based on the received second SSW frame.

18 Claims, 18 Drawing Sheets

(51) Int. Cl.
*H04B 7/0491* (2017.01)
*H04B 7/08* (2006.01)

(56) References Cited

U.S. PATENT DOCUMENTS

| | | |
|---|---|---|
| 2009/0273520 A1 | 11/2009 | Shao et al. |
| 2010/0265925 A1 | 10/2010 | Liu et al. |
| 2015/0230263 A1* | 8/2015 | Roy ..................... H04W 64/00 455/452.2 |
| 2015/0244432 A1 | 8/2015 | Wang |
| 2015/0249929 A1 | 9/2015 | Irie et al. |
| 2016/0105229 A1 | 4/2016 | Trainin et al. |
| 2016/0255660 A1* | 9/2016 | Son ..................... H04W 76/40 370/329 |
| 2016/0329947 A1 | 11/2016 | Jo et al. |
| 2017/0118656 A1 | 4/2017 | Xin et al. |
| 2017/0126303 A1 | 5/2017 | Jo et al. |
| 2017/0223552 A1 | 8/2017 | Roy et al. |
| 2019/0349782 A1 | 11/2019 | Kim et al. |

FOREIGN PATENT DOCUMENTS

| | | |
|---|---|---|
| EP | 3479642 A1 | 5/2019 |
| JP | 2015164271 A | 9/2015 |
| KR | 20160049461 A | 5/2016 |
| WO | 2015132827 A1 | 9/2015 |
| WO | 2016068521 A1 | 5/2016 |
| WO | 2016175949 A2 | 11/2016 |
| WO | 2017078780 A1 | 5/2017 |

\* cited by examiner

BEAMFORMING TRAINING METHOD AND APPARATUS

CROSS-REFERENCE TO RELATED APPLICATIONS

This application is a continuation of International Application No. PCT/CN2018/094753, filed on Jul. 6, 2018, which claims priority to Chinese Patent Application No. 201710553107.2, filed on Jul. 7, 2017. The disclosures of the aforementioned applications are hereby incorporated by reference in their entireties.

TECHNICAL FIELD

This application relates to the communications field, and in particular, to a beamforming training technology.

BACKGROUND

In millimeter-wave communication, a beamforming training process may include at least a sector level sweep (SLS) process, in which a chain between a data initiator and a data receiver that can communicate at a basic transmission rate may be established, a party that initiates beam training is the initiator, and the other party that participates in the beam training is a responder.

The SLS process may usually include at least an initiator sector sweep (IISS or I-SS) process and a responder sector sweep (RSS or R-SS) process. In the ISS process, the initiator sends a Sector Sweep (SSW) frame in different sector directions, and the responder omnidirectionally receives the Sector Sweep frame, and may learn an SSW frame that is of best quality and that is sent by the initiator. In the RSS process, the responder may feed back, by using an SSW feedback frame, a strongest sector direction received in the ISS phase to the initiator. Specifically, the responder sends the SSW feedback frame in different sector directions, and the initiator omnidirectionally receives the SSW feedback frame. In this way, the initiator may learn the Sector Sweep frame that is of the best quality and that is sent in the ISS phase, and then determine an optimal transmit beam in the SLS process.

In the SLS phase, especially in the RSS phase, when the initiator has a plurality of antennas, a manner of sequential sweeping (e.g., receiving) by using the plurality of antennas is used. This consumes a relatively long time.

To resolve the foregoing problem, this application provides a beamforming training method and apparatus, to save time.

To achieve the foregoing objective, embodiments of this application provide the following technical solutions.

According to one aspect, an embodiment of this application provides a beamforming training method, including: in an ISS process, sending, by an initiator, a training frame in different sector directions by sequentially using m antennas, and in an RSS process, receiving by using the m antennas or receiving by using an antenna set including the m antennas. Alternatively, it may be considered that in the ISS process, the initiator connects to an antenna by sequentially using m radio frequency chains for sending, and in the RSS process, the initiator uses the m radio frequency chains for receiving, or uses a set of radio frequency chains including the m radio frequency chains for receiving. Alternatively, it may be considered that in the ISS process, the initiator uses m radio frequency configurations, and in the RSS process, the initiator uses the m radio frequency configurations for receiving, or uses a radio frequency configuration set that includes the m radio frequency configurations for receiving. The radio frequency configuration may be a connection configuration between one or more radio frequency chains and one or more antennas. The training frame may be an SSW frame, an SLS frame, or a BF training frame, where m is not less than 1 and is less than or equal to N, and N is a total quantity of antennas that the initiator has. A plurality of antennas of the initiator may belong to a same network node, or may separately belong to a plurality of network nodes. The ISS process and the RSS process may occur in one BI, or one or two of the processes may span over a plurality of BIs. In addition, the ISS process may occur in a BTI, or may occur in a non-BTI interval. In the RSS process, when the initiator has a plurality of antennas, a multi-antenna parallel receiving manner (e.g., simultaneous receiving manner) is used. Compared with an existing manner in which sweeping (e.g., receiving) is performed by sequentially using a plurality of antennas, this manner can save time and improve efficiency.

In a possible design, an interaction procedure between the initiator and the responder includes: in the ISS process, sending, by the initiator, a first SSW frame in different sector directions by sequentially using an antenna in the m antennas, and omnidirectionally receiving, by the responder, the first SSW frame, and determining a first SSW frame with best quality in the ISS phase (in addition, an optimal antenna of the responder may be further determined); and in the RSS process, sending, by the responder, a second SSW frame in different sector directions by using the optimal antenna of the responder (for a responder that does not have antenna transmission-reception reciprocity in negotiation, the responder may send the second SSW frame in different sector directions by using all antennas), and omnidirectionally receiving, by the initiator, the second SSW frame in a parallel omnidirectional manner by using M antennas, where the M antennas include at least the m antennas. For example, it is assumed that the initiator includes antennas 0 to 2. In the ISS phase, the initiator sends the first SSW frame by using the antennas 0 and 1, and in the RSS phase, the initiator may receive the second SSW frame in a parallel omnidirectional manner by using the antennas 0 and 1, or may receive the second SSW frame in a parallel omnidirectional manner by using the antennas 0 to 2. The initiator may determine an optimal transmit beam in the ISS process based on the received second SSW frame. In this embodiment, an SSW frame transmitted in the ISS process is referred to as the first SSW frame, and an SSW frame transmitted in the RSS process is referred to as a second SSW frame. The first or second SSW frame may include one or more identifiers in an antenna, a sector, and a countdown value. In addition, in this embodiment, ISS and RSS are located in a same BI. In the RSS process, an SSW frame is received in a parallel manner by using a plurality of antennas (e.g., RF chains). This can effectively improve responder sector sweep efficiency and shorten sector sweepSector Sweep time in the RSS process. In addition, because a plurality of antennas simultaneously perform receiving, an effect of diversity reception and signal combination can be obtained, and therefore, robustness of sector sweepSector Sweep in the RSS process can be further improved.

In a possible design, in a scenario in which the initiator and the responder have not established a connection, and the responder attempts initial access, the m antennas may be classified into K sending groups, and each sending group may include one antenna or may include a plurality of antennas. The ISS phase spans over BTIs of K (K is a positive integer greater than 1) BIs. The initiator may send the first SSW frame (namely, a beacon frame) in different sector directions by using an antenna in one of the sending groups in a BTI of each BI of the K BIs. If the initiator has a plurality of RF chains, in one BTI, it may be stipulated that each RF chain may maintain use of a same antenna, in other words, the initiator does not switch an antenna of each RF chain in one BTI. The initiator may perform sending by using the plurality of RF chains in rotation, to implement sequential sending. Another optional implementation includes the following: The initiator performs sending by using the plurality of RF chains, to superpose transmit power and enhance a signal. In addition, when a plurality of antennas are used for transmission in one BTI, each antenna may occupy different time periods (which may be referred to as a BTI subinterval) in the BTI. However, the RSS phase may occur in an A-BFT period of a $K^{th}$ BI. The responder may send, in the A-BFT period of the $K^{th}$ BI, the second SSW frame in different sector directions by using the optimal antenna of the responder. The initiator does not perform antenna switching in the RSS phase, and may receive, in the A-BFT period of the $K^{th}$ BI, the second SSW frame in a parallel omnidirectional manner by using the M antennas. In the A-BFT period, an antenna on each RF chain may be configured as a pseudo omnidirectional directivity pattern mode for simultaneous reception. In other words, in the A-BFT period, antennas used by the initiator are a plurality of antennas corresponding to antenna ID values used by the initiator in antenna ID subfields of sector sweep fields of a plurality of beacon frames. In this embodiment, the ISS spans over a plurality of BIs. For each BI period, a length of the BTI is not significantly increased. In addition, in the RSS process, an SSW frame is received in a parallel manner by using a plurality of antennas (RF chains). This effectively improves responder sector sweep efficiency and shortens sector sweep time in the RSS process. In addition, because a plurality of antennas simultaneously perform receiving, an effect of diversity reception and signal combination can be obtained, and therefore, robustness of sector sweep in the RSS process can be further improved.

In a possible design, the RSS process is divided into K subphases. The foregoing m antennas are classified into K sending groups, and each sending group may include one antenna or may include a plurality of antennas. The foregoing M antennas are classified into K receiving groups, each receiving group includes at least one antenna, and at least one group includes two or more antennas. A value of K may be determined by negotiation between the initiator and the responder, or the responder may be notified of the value of K by the initiator. It should be noted that antenna switching is performed in this embodiment. Specifically, in the ISS phase, the initiator may sequentially switch between a plurality of sending groups, and sends the first SSW frame (namely, a beacon frame) in different sector directions by using an antenna in each sending group. In an example, the K sending groups may be switched in a same BI. In the RSS phase, the responder sends the second SSW frame in different sector directions by using the optimal antenna of the responder in the K subphases. Because there are K subphases in total, the responder sends the sector sweep frame for K times. The initiator receives, in each subphase, the second SSW frame (the K subphases are in a one-to-one correspondence with the K receiving groups) in a parallel omnidirectional manner by using an antenna in one of the receiving groups. In another example, the ISS phase in this embodiment may occur in the non-BTI interval. Correspondingly, the RSS phase occurs in an A-BFT period of a same BI, that is, a receiving group is switched in the A-BFT period. Alternatively, in still another example, the ISS phase and the RSS phase may span over a plurality of BIs, and the initiator does not perform antenna switching in an A-BFT phase of one BI (that is, antennas used in a BTI and an A-BFT period of a same BI overlap). In this case, K A-BFT periods may occur in the K subphases of the RSS phase. Alternatively, in still another example, the ISS phase spans over BTIs of K BIs, and the RSS phase occurs in the A-BFT period of the $K^{th}$ BI, that is, receiving group switching is performed in one A-BFT period. Alternatively, in still another example, in the RSS phase, the initiator may switch a receiving antenna combination every L A-BFT allocations, where L is a value of N A-BFT subfields used by each antenna in a beacon interval control field. L is related to a total quantity of sectors of the initiator in the ISS phase and a quantity of beacon frames that can be transmitted in each BTI. For example, it is assumed that a total quantity of sectors of the initiator is 20, and a maximum quantity of beacon frames that can be transmitted in one BTI is 10. In this case, the ISS phase needs to be completed by using two BIs. In this case, L=2. In the RSS phase, the responder performs antenna switching every two ABFT periods.

In a possible design, in a scenario in which the ISS occurs in the non-BTI interval, if the responder also has a plurality of RF chains, the following operation may be performed: The initiator includes a field of a total quantity of sectors of the ISS in a sector sweep feedback field or another field of the first SSW frame. The total quantity of sectors can be used by the responder to determine when to switch an antenna. In an example, the total quantity of sectors may be obtained by using the following calculation method: a sum of quantities of sectors used by all antennas in the ISS phase is multiplied by a value of a maximum quantity of switched antennas (or may be referred to as a quantity of training antennas) required in a plurality of RF chains of the responder, where an obtained product is the total quantity of sectors. For example, the responder has two RF chains, one may be connected to two antennas, and the other one may be connected to three antennas. In this case, a maximum quantity of switched antennas of the responder is 3. It is assumed that the sum of quantities of sectors used by all antennas in the ISS phase is 20. In this case, the total quantity of sectors is 60. The quantity of switched antennas is as follows: For example, when one RF chain needs to be connected to two antennas for training, one of the two antennas may be selected for switching. It may be specifically specified in a protocol that the quantity of switched antennas is 2 or a quantity of switching times is 1. This does not cause ambiguity. The responder may carry, by using a value in a field of a quantity of receive antennas negotiated recently by the responder, a value or information expression of the maximum quantity of switched antennas required in the plurality of RF chains of the responder. In another example, if all RF chains of the responder have a same quantity of switched antennas (or quantity of training antennas), the total quantity of sectors of the ISS is obtained by using the following calculation method: the sum of quantities of sectors used by all antennas in the ISS phase is multiplied by a value of the quantity of switched antennas (or a quantity of training antennas) required in the plurality of RF chains of the responder, where an obtained product is the total quantity of sectors. The quantity of switched antennas may be obtained by negotiation between the initiator and the responder. In addition, if the ISS is outside the BTI, and at least one RF chain of the responder needs to train more than one antenna, or each RF chain needs to train more than one antenna, the initiator repeats performing sector sweepSector Sweep in the ISS for a plurality of times. A quantity of repetition times of the initiator is the value in the field of the quantity of receive antennas negotiated recently by the responder. However, if a plurality of RF chains of the responder need to train more than one antenna, antenna switching needs to be simultaneously performed for the plurality of RF chains in the ISS, and repeated sector sweep Sector Sweep may be performed at an interval of an LBIFS during switching. At the beginning of the ISS, the responder may configure a plurality of antennas on the plurality of RF chains in a pseudo omnidirectional directivity pattern mode and maintain the pseudo omnidirectional directivity pattern mode in a specified time interval. A length of the specified time interval is that the total quantity of sectors negotiated recently by the initiator is multiplied by a sum of transmission time of a single SSW frame plus a corresponding IFS interval (for example, an SBIFS, an LBIFS, or the like defined in the protocol). In a next specified time interval after the specified time interval, the responder can switch the RF chain to another antenna configured in the pseudo omnidirectional directivity pattern mode.

In a possible design, switching may be performed in the following manner: Phase A: A target RF chain sends the first SSW frame in different sector directions by connecting to a first antenna. For ease of description, any RF chain of the initiator or responder may be referred to as the target RF chain. Phase B: After waiting for the SBIFS, a second antenna connected to another RF chain sends the first SSW frame in different sector directions. Phase C: Within a period in which the second antenna sends the first SSW frame, the target RF chain switches and connects to a third antenna. The phase C and the phase B coincide in terms of time. Phase D: After the second antenna sends the first SSW frame in different sector directions, third antenna connected to the target RF chain sends the first SSW frame in different sector directions after waiting for the SBIFS. More specifically, in an example, the first SSW frame may be alternately sent by a plurality of RF chains. Therefore, for each RF chain, CDOWNs of the first SSW frame sent by the first RF chain are discontinuous, and are odd numbers or even numbers. In another example, numbers of antennas are increased progressively (certainly, may be decreased progressively). After an antenna is switched, the first SSW frame is consecutively sent by using the switched antenna. It can be learned that in the switching manner provided in this embodiment of this application, there is only the SBIFS, and the LBIFS no longer needs to be waited for. This reduces a waste of time caused by antenna switching of the RF chain. This application may also be applied to a case in which another antenna training sequence is used in an embodiment, including but not limited to a progressive increase or a progressive decrease in antenna numbers, or a progressive increase or a progressive decrease in numbers of antennas trained on a single RF chain.

In a possible design, the initiator may include one network node (for example, an AP), or may include a plurality of network nodes. When there are a plurality of network nodes, a coordination interval may be configured within at least one BI. A plurality of network devices may negotiate, in the coordination interval, at least one of an antenna identifier, a countdown value, a sector identifier, a BTI subinterval occupied by each network device, an A-BFT subinterval occupied by each network device, and an ATI subinterval occupied by each network device. Coordination between the plurality of network devices usually occurs before the ISS. In this case, the coordination interval may be correspondingly prior to a BTI. Optionally, a beacon frame sent by a different antenna may indicate a start time of a corresponding A-BFT subinterval, or a start time of a corresponding ATI subinterval, or may indicate a start time of a subinterval occupied by another interval. In another embodiment, one BI may include one or more coordination intervals. If one BI includes a plurality of coordination intervals, different content may be negotiated in different coordination intervals. For example, before an ATI, a negotiation interval may be configured to negotiate an ATI subinterval used by each antenna or each network device. A person skilled in the art may design flexibly, and details are not described herein. In addition, it should be noted that the coordination interval may be set in each BI, or a coordination interval may be set every several BIs. A person skilled in the art may design flexibly, and details are not described herein.

In a possible design, for compatibility purposes, in a same BTI, the plurality of antennas used by the initiator can share a same antenna identifier. Some responders may consider that the initiator performs sending by using only a single antenna within one BTI. In the same BTI, the plurality of antennas share the same antenna identifier to implement compatibility. Alternatively, in a same BTI, each antenna may use its own antenna identifier. Because the responder may not receive frames sent by all antennas, each antenna is allowed to use its own antenna identifier.

In a possible design, multiple-input multiple-output (MIMO) transmission may further be performed in one BI by using an antenna set including a primary antenna. The primary antenna includes an antenna that sends the first SSW frame in a BTI of the BI. To be specific, the AP cannot change a primary DMG antenna within one BTI, so as to better implement beamforming training.

According to another aspect, an embodiment of this application provides a beamforming training apparatus, and the beamforming training apparatus has a function of implementing behavior of a beamforming training apparatus (which may be used as an initiator or a responder) in the foregoing method in actual application. The function may be implemented by using hardware, or may be implemented by hardware executing corresponding software.

According to another aspect, this application provides a computer-readable storage medium. The computer-readable storage medium stores an instruction, and when the instruction runs on a computer, the computer is enabled to perform the method according to the foregoing aspect.

According to another aspect, this application provides a computer program product including an instruction. When the computer program product runs on a computer, the computer is enabled to perform the method according to the foregoing aspect.

According to another aspect, this application provides a chip system, and the chip system includes a processor, configured to support a data sending device in implementing functions in the foregoing aspects, for example, generating or processing data and/or information in the foregoing method. In a possible design, the chip system further includes a memory, and the memory is configured to store a program instruction and data that are necessary for the data sending device. The chip system may include a chip, or may include a chip and another discrete component.

It can be learned that, in the solutions provided in this application, in the RSS process, when the initiator has a plurality of antennas, a multi-antenna parallel receiving manner is used. Compared with an existing manner in which sweeping (receiving) is performed by sequentially using a plurality of antennas, this manner can save time and improve efficiency.

DETAILED DESCRIPTION OF ILLUSTRATIVE EMBODIMENTS

Figure 1:
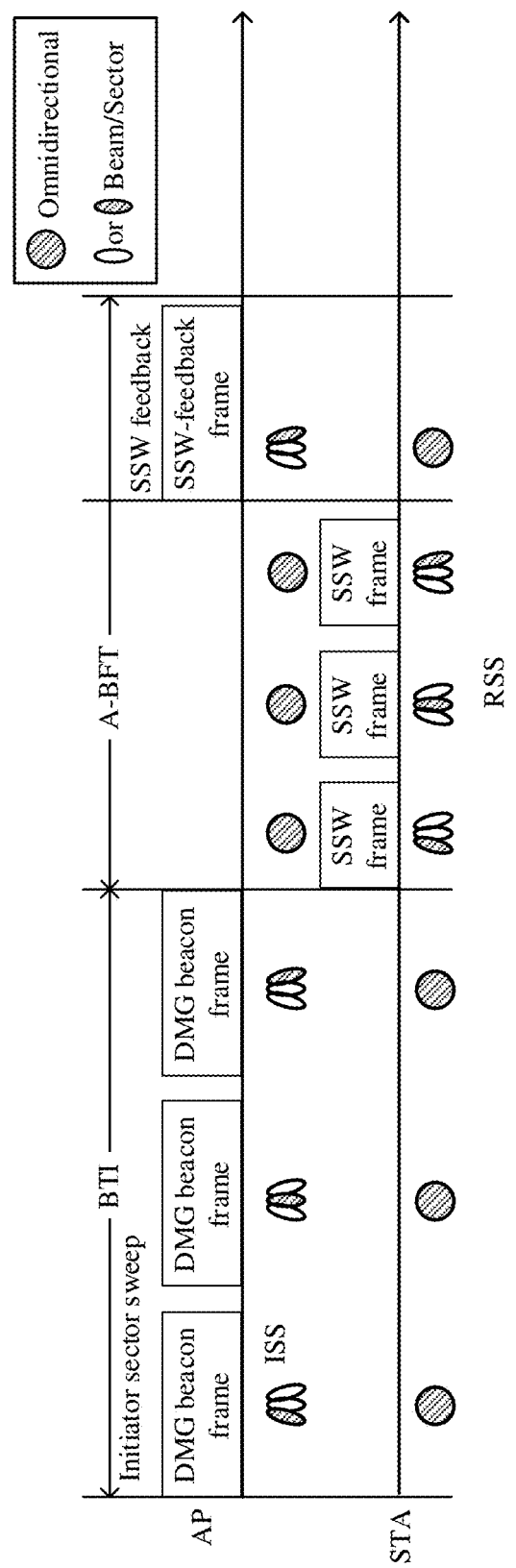
FIGS. 1, 2, 7, 9, 10, 13, 14a, 14b, and 15 to 17 are schematic diagrams of a beamforming training process according to an embodiment of this application.

In millimeter-wave communication, to implement data transmission and reception, a transmit beam direction of a data initiator needs to cover a receive beam direction of a data receiver, that is, a transmit beam and a receive beam can be aligned. A process of aligning the transmit beam and the receive beam is referred to as a beamforming (BF) training process.

Beamforming is a method of implementing a necessary transmission link budget for a subsequent communication process by two or more communication parties. To be specific, a transmit and/or receive signal is concentrated in a beam direction that points to a receiver or a transmitter, to enhance a signal, and therefore improve communication signal quality.

In an embodiment, the BF training process are described below:

s frame: Sector Sweep Frame (SSW frame for short) where the SSW frame may be used for BF training, and in some communications systems, an SLS frame and a BF training frame may also be used for training;

sector level sweep: SLS;
initiator sector sweep: ISS (I-SS);
responder sector sweep: RSS (R-SS);
beacon interval: BI;
radio frequency: RF;
long beamforming interframe space: LBIFS;
short beamforming interframe space: Short Beamforming Interframe Space, SBIFS, where the SBIFS is used to separate a plurality of transmissions from one transmitter, or is used when transmission occurs with a different antenna configuration and no response that is an SIFS (Short Interframe Space) time later is expected. Duration of the SBIFS is determined by a physical layer feature, and a typical value is 0.03 μs;

access point: AP;
station: STA;
personal basic service set: PBSS;
PBSS control point: PCP, which is a name of a role of the AP in the PBSS;
directional multi-gigabit: DMG (namely, a name of the 802.11ad protocol);
announcement transmission interval: ATI, which is used by the AP to interrogate a STA, or used by the AP to send an announcement, for example, a management frame, or used for subsequent CBAP and SP allocation;

contention based access period: CBAP, which is a transmission period in which a STA accesses a channel in a random contention access manner;

service period: SP, which is a transmission period in which the AP pre-schedules a transceiver station;

beacon transmission interval: BTI, that is, a time interval from transmission of the first DMG beacon frame by a DMG station (usually the AP) in a beacon interval to transmission of a last DMG beacon frame in the same beacon interval, which is used by the AP to perform initiator transmit sector sweep, provide enough beamforming gain and link budget, enable a STA around the AP to receive a beacon frame, and learn an optimal AP sector transmit direction for the STA;

association beamforming training period: A-BFT for short, which is used by the AP to perform an RSS step and receive an SSW feedback frame after receiving a beacon frame (which may also be referred to as an ISS frame) in a BTI;

countdown: where a value of the CDOWN field is a quantity of remaining SSW frames (or referred to as transmission frames) in initiator sector sweep or responder sector sweep, and further includes a quantity of required LBIFSs, so that a CDOWN field carried in a last SSW frame in sector sweep is exactly 0. After receiving the SSW frame, a beam training receiver can determine, based on the CDOWN field, an end time of the sector sweep or a time for replying to the other party;

RF chain: which is may be used for a physical entity of a receive chain or a transmit chain, and is usually connected to an antenna together by an ADC (analog-to-digital converter) or a DAC (digital-to-analog converter), where the physical entity may include an element configured to perform processing such as up-and-down conversion, filtering, and power amplification (low noise amplification). The RF chain adjusts a signal to a signal suitable for sending by using a radio frequency antenna or converts a signal collected by an antenna into a signal suitable for sampling and baseband processing, and when an RF chain is fixedly connected to a specific antenna, an RF chain identifier or an antenna identifier may be used to separately identify the RF chain and the specific antenna, or identify an entirety formed by the RF chain and the specific antenna. In implementation, a plurality of antennas can obtain a diversity effect due to relatively high costs of the RF chain, and therefore, one RF chain may be dynamically configured to be connected to one specific antenna in the plurality of antennas, and a connection relationship between an RF chain and an antenna may be referred to as a radio frequency configuration; and antenna (or DMG antenna): which is usually a single basic antenna formed by a phased array or a set formed by a series of switchable beam antennas. The single basic antenna or the set can form a pseudo omnidirectional directivity pattern. In any implementation, the antenna can be dynamically configured as the pseudo omnidirectional directivity pattern to perform sending and receiving, or may be dynamically configured to perform sending or receiving for a specific sector or beam direction.

The BF process may include at least an SLS process, in which a BF frame is sent through directional sweeping, so as to complete at least training of a transmit beam. When a participating STA uses only one transmit antenna directivity pattern (beam direction), beam receive training may also be performed in the SLS phase.

For the foregoing terms, reference may be made to the 802.11ad standard, the 802.11ay standard, or another WiFi standard, but is not limited thereto. Details are not described herein again.

A complete SLS procedure, or referred to as a basic sector sweepSector Sweep procedure, usually includes four steps: ISS, RSS, Sector Sweep feedback, and sector sweepSector Sweep acknowledgment. In initial access, an additional technical limitation is added to the SLS process, and there is no sector sweepSector Sweep acknowledgment step (refer to FIG. 1).

The ISS and the RSS have been briefly described above. In a sector feedback process, the initiator sends an SSW feedback frame, and feeds back a strongest sector direction received in the RSS phase to the responder. The SSW feedback frame is sent by the initiator by using the strongest sector direction and a strongest antenna that are fed back by the responder. The responder omnidirectionally receives the SSW feedback frame.

In some communications systems, the BF frame may further include an SSW frame, a short SSW frame, a beacon frame, an SSW feedback frame, an SSW acknowledgement frame, or another beamforming-related frame, such as a frame used for setting, triggering, reference, and feedback. The SSW frame includes one or more identifiers in an antenna, a sector, and a countdown value.

In the SLS process, especially in the RSS phase, when the initiator has a plurality of antennas, a manner of sequential sweeping (receiving) using the plurality of antennas needs to be used. This consumes a relatively long time.

For example, the AP or the PCP is the initiator and the STA is the responder. In one BI, in a scenario in which the STA performs initial access, referring to FIG. 1, the ISS process may occur in the BTI, and the RSS process may occur in the A-BFT period. In a scenario in which the AP has established an association with the STA, the ISS process usually occurs in a non-BTI interval.

In one BI, the AP is used as the initiator to perform transmit sector sweep (TXSS), and send at least one beacon frame (the SSW frame includes the beacon frame) in the BTI interval, so as to broadcast basic information, and enable the station to perform initial access. The A-BFT period is adjacent to the BTI, and may be used to perform initial access. From the beginning to the end of a TXSS phase, the AP or PCP should keep a value of a beacon interval control field and a value of a DMG parameter field in the beacon frame sent by the AP are the same, that is, content of the beacon frames is the same.

After receiving the beacon frame in the BTI, the STA sends the SSW feedback frame in the A-BFT period (that is, performs the RSS step). In the A-BFT phase, the AP should perform receiving, in the entire A-BFT, by using a pseudo omnidirectional antenna directivity pattern of a single DMG antenna, unless the AP performs receive sector sweep (receive in different receiving sector modes). In A-BFT, the AP or PCP should perform receiving (namely, the omnidirectional reception mentioned above) by using a DMG antenna indicated by a DMG antenna ID field value and the pseudo omnidirectional antenna directivity pattern. A DMG antenna ID field is included in an SSW field of a DMG beacon frame.

Even if the AP has a plurality of antennas, according to an existing protocol, in a BTI and an A-BFT period of a BI, the AP needs to use a same single antenna for receiving and sending, and cannot switch (e.g., change) an antenna.

Although the AP has a plurality of antennas, there is only one radio frequency (RF) chain, and one RF chain cannot be effectively connected to a plurality of antennas at a same moment. If different antennas are used in a BTI and an A-BFT period of a same BI (for example, a first antenna is used in the BTI and a second antenna is used in the A-BFT), because different antennas correspond to different sectors, the AP may not receive an SSW feedback frame sent by a STA in a sector of the first antenna in the RSS phase.

It can be learned that in an initial access process, in the RSS phase, the initiator uses a manner in which sweeping (e.g., receiving) is performed by sequentially using a plurality of antennas. If a plurality of antennas are all used for receiving, a plurality of BI intervals are required. As a result, time overheads are high, and initial access time of a station is long.

Figure 2:
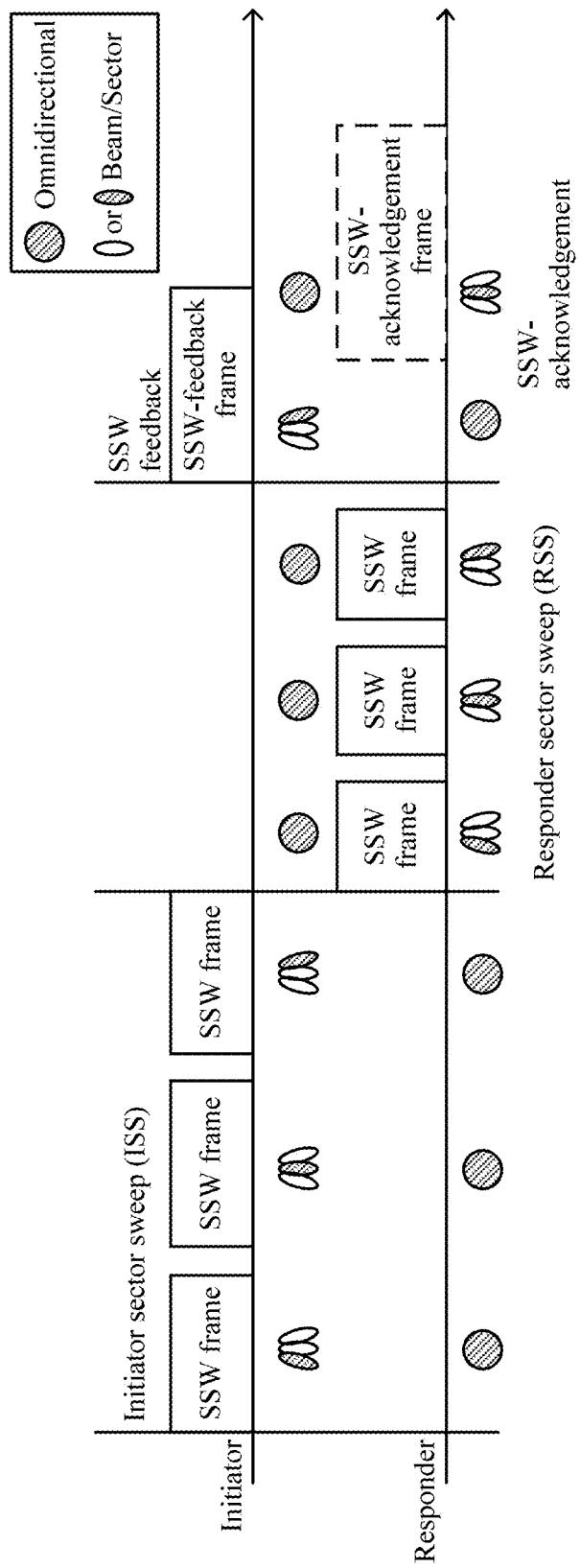

However, in a scenario in which the ISS process occurs in the non-BTI interval, referring to FIG. 2, when a STA has a plurality of antennas and the initiator performs sector sweep, if the initiator sweeps four sectors on an antenna 0, sweeps three sectors on an antenna 1, and sweeps five sectors on an antenna 2, and the responder has two DMG receive antennas, a field of a total quantity of swept sectors of an SSW frame sent in the ISS process needs to be set to (4+3+5)× 2=24.

In the ISS process, a quantity of times of repeated sector sweep is a quantity of DMG antennas of the responder. The quantity of DMG antennas is a quantity of DMG antennas indicated by the responder in a field of a quantity of recently sent DMG receive antennas.

In the ISS process, the responder configures a first DMG antenna as an omnidirectional directivity pattern, and keeps antenna configuration unchanged within specific time. The specific time is that a value in a field of a recently negotiated total quantity of sectors is multiplied by a sum of time of a single SSW frame plus corresponding interframe space (IFS). After this time, the responder may switch to a DMG antenna of another (e.g., pseudo) omnidirectional directivity pattern.

Because there is only one RF chain, the ISS process occurs in the non-BTI interval scenario, and in the RSS phase, the manner in which sweeping (e.g., receiving) is performed by sequentially using a plurality of antennas is also used. As a result, efficiency is relatively low.

According to a beamforming training method and apparatus provided in the embodiments of this application, the foregoing problem can be resolved. The beamforming training apparatus provided in the embodiments of this application may be used as an initiator or a responder.

It is assumed that the initiator has N antennas. A technical concept of this application is as follows:

In the ISS process, the initiator sequentially sends a first SSW frame in different sector directions by using an antenna in m (m is not less than 1, and is less than or equal to N) antennas, where different sector directions correspond to different beams.

In the RSS process, the initiator receives a second SSW frame in a parallel omnidirectional manner by using M antennas. The M antennas include at least the m antennas that send the first SSW frame in the ISS process.

Alternatively, it may be considered that in the ISS process, the initiator connects to an antenna by sequentially using m radio frequency chains for sending, and in the RSS process, the initiator uses the m radio frequency chains for receiving, or uses a set of radio frequency chains including the m radio frequency chains for receiving.

Alternatively, it may be considered that in the ISS process, the initiator uses m radio frequency configurations, and in the RSS, the initiator uses the m radio frequency configurations for receiving, or uses a radio frequency configuration set that includes the m radio frequency configurations for receiving. The radio frequency configuration may be a connection configuration between one or more radio frequency chains and one or more antennas.

Compared with the existing manner in which sweeping (e.g., receiving) is performed by sequentially using a plurality of antennas, a multi-antenna parallel receiving manner may save time and improve efficiency.

Figure 3:
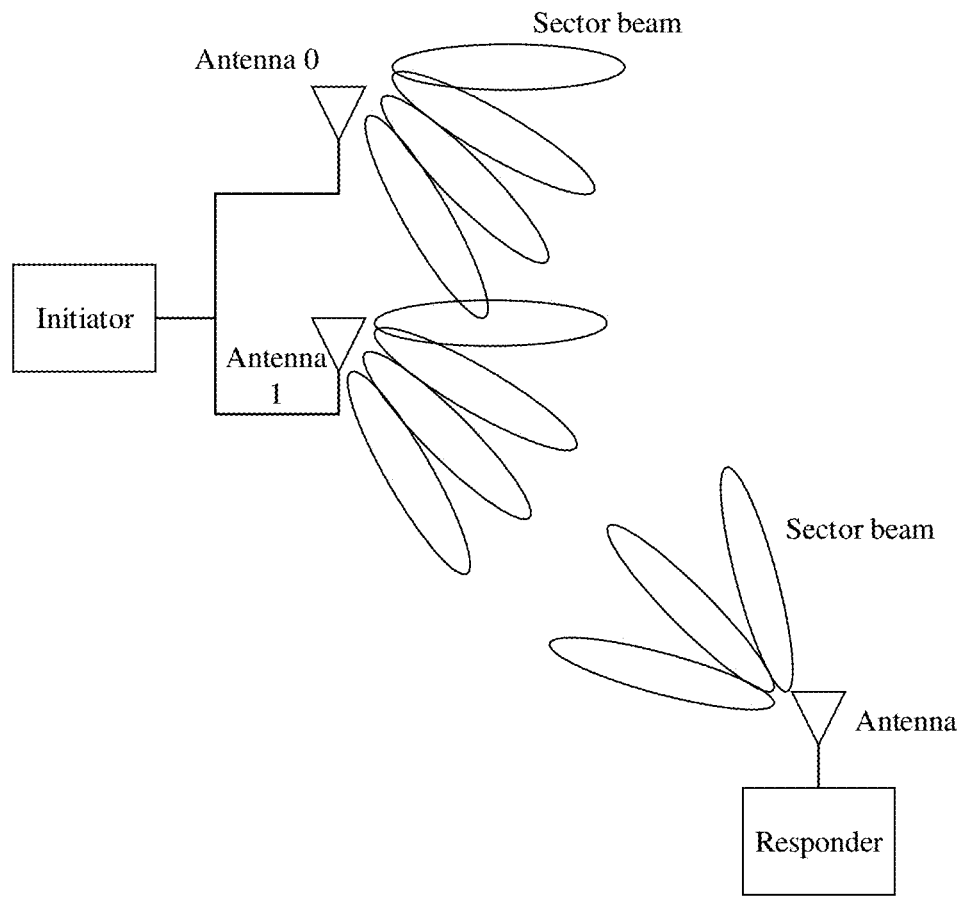
FIG. 3 and FIG. 4 are schematic diagrams of an application scenario according to an embodiment of this application.

FIG. 3 shows an example application scenario of the foregoing beamforming training apparatus. In this scenario, two beamforming training apparatuses are used as an initiator and a responder to perform communication in a wireless manner, and the initiator has a sector beamforming capability.

For example, an AP communicates with a STA. The AP needs to determine, through sector sweepSector Sweep, a sector transmit direction used for transmission to the STA. The AP serves as the initiator, and the STA may serve as a responder.

The initiator may include a plurality of antennas (for example, an antenna 0 and an antenna 1), and the responder may include one or more antennas.

When both the initiator and the responder include a plurality of antennas, a multiple-input multiple-output (MIMO) system may be applied.

Figure 4:
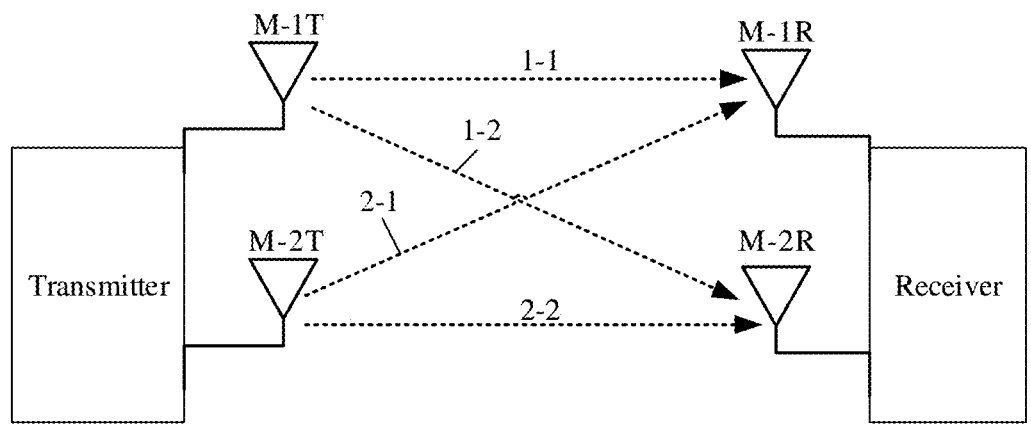

A transmitter and a receiver in a system shown in FIG. 4 may specifically be a transmitter of an initiator and a receiver of a responder, or a receiver of an initiator and a transmitter of a responder. In addition, the transmitter in the schematic structural diagram shown in FIG. 4 includes two transmit antennas, which are respectively a first transmit antenna M-1T and a second transmit antenna M-2T. The receiver includes two receive antennas, which are respectively a first receive antenna M-2R and a second receive antenna M-2R. There are four channels between the two transmit antennas and the two receive antennas, which are respectively 1-1 (a channel between the first transmit antenna and the first receive antenna), 1-2 (a channel between the first transmit antenna and the second receive antenna), 2-1 (a channel between the second transmit antenna and the first receive antenna), and 2-2 (a channel between the second transmit antenna and the second receive antenna). Certainly, although the antenna is classified into a transmit antenna and a receive antenna in FIG. 4, a person skilled in the art may understand that for an apparatus, a same antenna may be used to receive and transmit a signal. The antenna is a transmit antenna when a signal is transmitted, and is a receive antenna when a signal is received.

The beamforming training apparatus used as the initiator or the responder in this embodiment of the present invention may be a base station, an access point, or a device in an access network that communicates with a wireless terminal by using one or more sectors on an air interface. For example, the base station may be a base transceiver station (BTS) in GSM or CDMA, or may be a NodeB in WCDMA, or may be an evolved NodeB (eNB or e-NodeB, evolved Node B) in LTE. This is not limited in this application.

Certainly, the beamforming training apparatus may alternatively be a device that provides a user with voice and/or data connectivity, a handheld device with a wireless connection function, or another processing device connected to a wireless modem. The wireless terminal may be a mobile terminal such as a mobile phone (also referred to as a "cellular" phone) or a computer with a mobile terminal, for example, may be a portable, pocket-sized, handheld, computer built-in, or in-vehicle mobile apparatus that exchanges voice and/or data with a radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may alternatively be referred to as a system, a subscriber unit, a subscriber station, a mobile station, a mobile console, a remote station, an access point, a remote terminal, an access terminal, a user terminal, a user agent, a user device, user equipment, or the like.

Figure 5A:
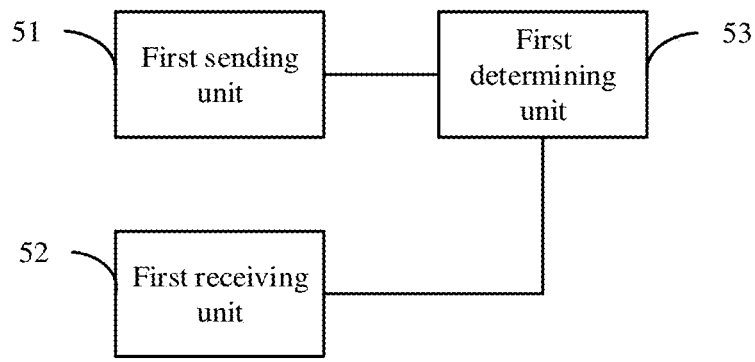
FIG. 5a to FIG. 5c are example structural diagrams of a beamforming training apparatus according to an embodiment of this application.

FIG. 5a shows an example structure of the foregoing beamforming training apparatus as an initiator. The apparatus includes a first sending unit 51, a first receiving unit 52, and a first determining unit 53. Functions of the units are described subsequently in this specification with reference to the method part.

Figure 5B:
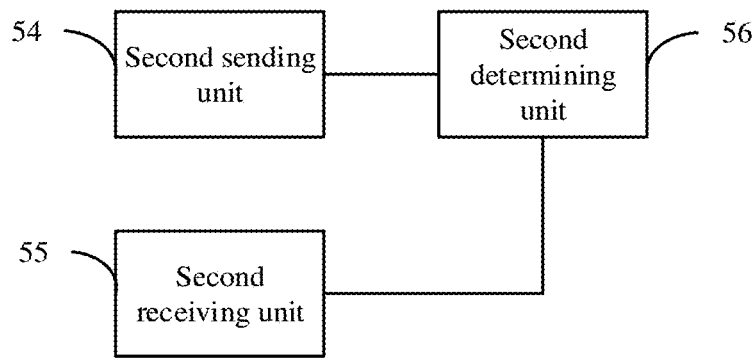

FIG. 5b shows an example structure of the foregoing beamforming training apparatus as a responder. The apparatus includes a second sending unit 54, a second receiving unit 55, and a second determining unit 56.

Certainly, the beamforming training apparatus may be used as an initiator in a scenario, or may be used as a responder in another scenario. Therefore, one beamforming training apparatus may include the first sending unit 51, the first receiving unit 52, the first determining unit 53, the second sending unit 54, the second receiving unit 55, and the second determining unit 56 at the same time.

Functions of the units are described subsequently in this specification with reference to the method part.

Figure 5C:
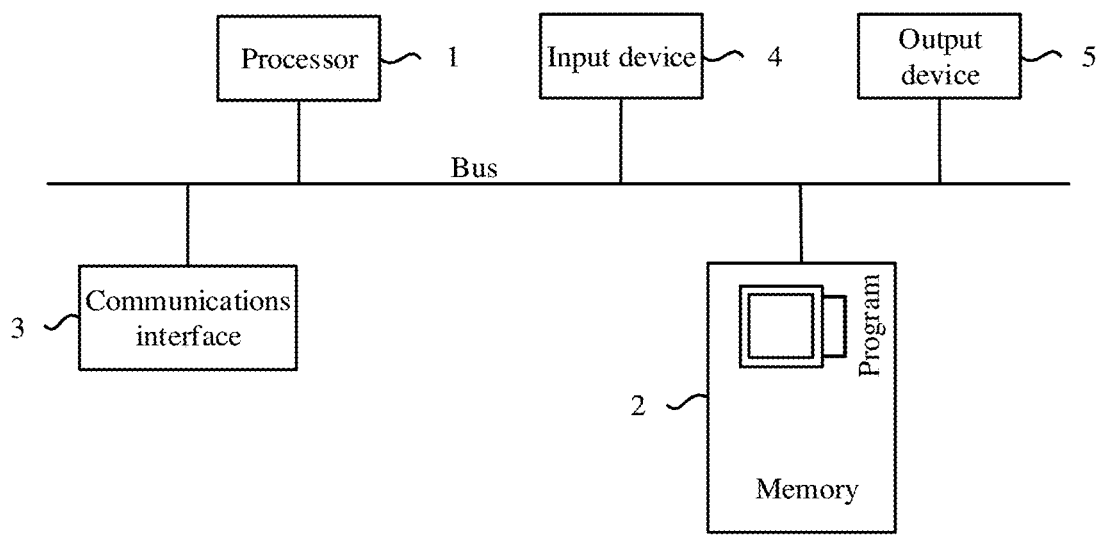

FIG. 5c shows still another example structure of the foregoing beamforming training apparatus, including a bus, a controller/processor 1, a memory 2, and a communications interface 3.

Optionally, the beamforming training apparatus may further include an input device 4 and an output device 5.

The processor 1, the memory 2, the input device 4, and the output device 5 are connected to each other by using the bus.

The bus may include a path used for transferring information between components of a computer system.

The controller/processor 1 may be a general purpose processor such as a general-purpose central processing unit (CPU), a network processor (NP), or a microprocessor, or may be an application-specific integrated circuit (ASIC) or one or more integrated circuits that are configured to control program execution in the solutions of this application. Alternatively, the controller/processor 1 may be a digital signal processor (DSP), a field-programmable gate array (FPGA) or another programmable logic device, a discrete gate or a transistor logic device, or a discrete hardware component. Alternatively, the controller/processor 1 may be a combination of processors implementing a computing function, for example, a combination of one or more microprocessors or a combination of a DSP and a microprocessor.

The processor 1 may be configured to implement functions of the first determining unit 53 and the second determining unit 56.

The memory 2 stores a program used to execute the solutions of this application, and may further store an operating system and another application program. Specifically, the program may include program code, and the program code includes a computer operation instruction. More specifically, the memory 2 may be a read-only memory (ROM), a static storage device of another type that can store static information and instructions, a random access memory (RAM), a dynamic storage device of another type that can store information and instructions, a magnetic disk storage, or the like.

The input device 4 may include a terminal device that receives data and information entered by a user, such as a keyboard, a mouse, a camera, a scanner, a light pen, a voice input terminal device, and a touchscreen.

The output device 5 may include a terminal device that allows output of information to the user, for example, a screen unit.

The communications interface 3 may include a terminal device that uses any transceiver, to support the control terminal device in communicating with another device or a communications network. The communications interface 3 may be configured to implement the functions of the first sending unit 51, the first receiving unit 52, the first determining unit 53, the second sending unit 54, and the second receiving unit 55.

It may be understood that FIG. 5c shows only a simplified design of the control terminal device. In actual application, the control terminal device may include any quantity of transmitters, receivers, processors, controllers, memories, communications interfaces, and the like, and all control terminal devices that can implement this application fall within the protection scope of this application.

The processor 1 executes the program stored in the memory 2, and invokes another device. The processor 1 may be configured to implement a beamforming training method provided in the embodiments shown in FIG. 6, FIG. 8, and FIG. 12 below.

The embodiments of this application are further described in detail below based on the foregoing commonalities of this application.

A relatively simple embodiment is described first. In this embodiment, an initiator and a responder have established a connection. The initiator has a plurality of antennas, and does not perform antenna switching in an RSS phase. In addition, the initiator may include one network device (for example, an AP), or may include a plurality of network devices. Therefore, the plurality of antennas of the initiator may belong to a same network node, or may separately belong to a plurality of network nodes.

Figure 6:
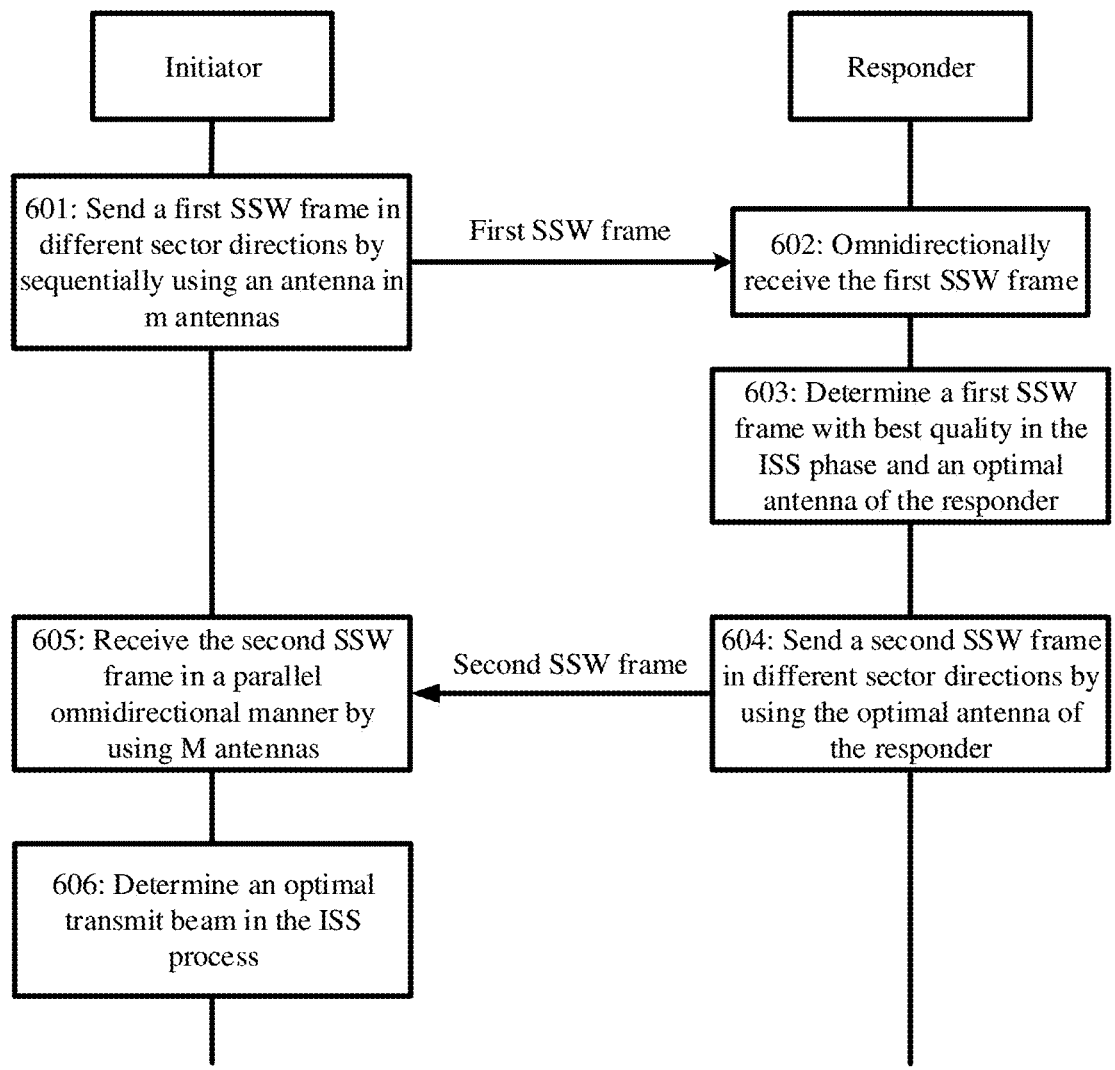
FIG. 6, FIG. 8, and FIG. 12 are example flowcharts of a beamforming training method according to an embodiment of this application.

FIG. 6 shows an example interaction procedure of the foregoing BF training method, including the following steps.

S601: In an ISS process, an initiator sends a first SSW frame in different sector directions by sequentially using an antenna in m antennas.

In this embodiment, an SSW frame transmitted in the ISS process is referred to as the first SSW frame, and an SSW frame transmitted in an RSS process is referred to as a second SSW frame. The first or second SSW frame may include one or more identifiers in an antenna, a sector, and a countdown value.

Sending an SSW frame in different sector directions may be referred to as sector sweepSector Sweep.

Figure 7:
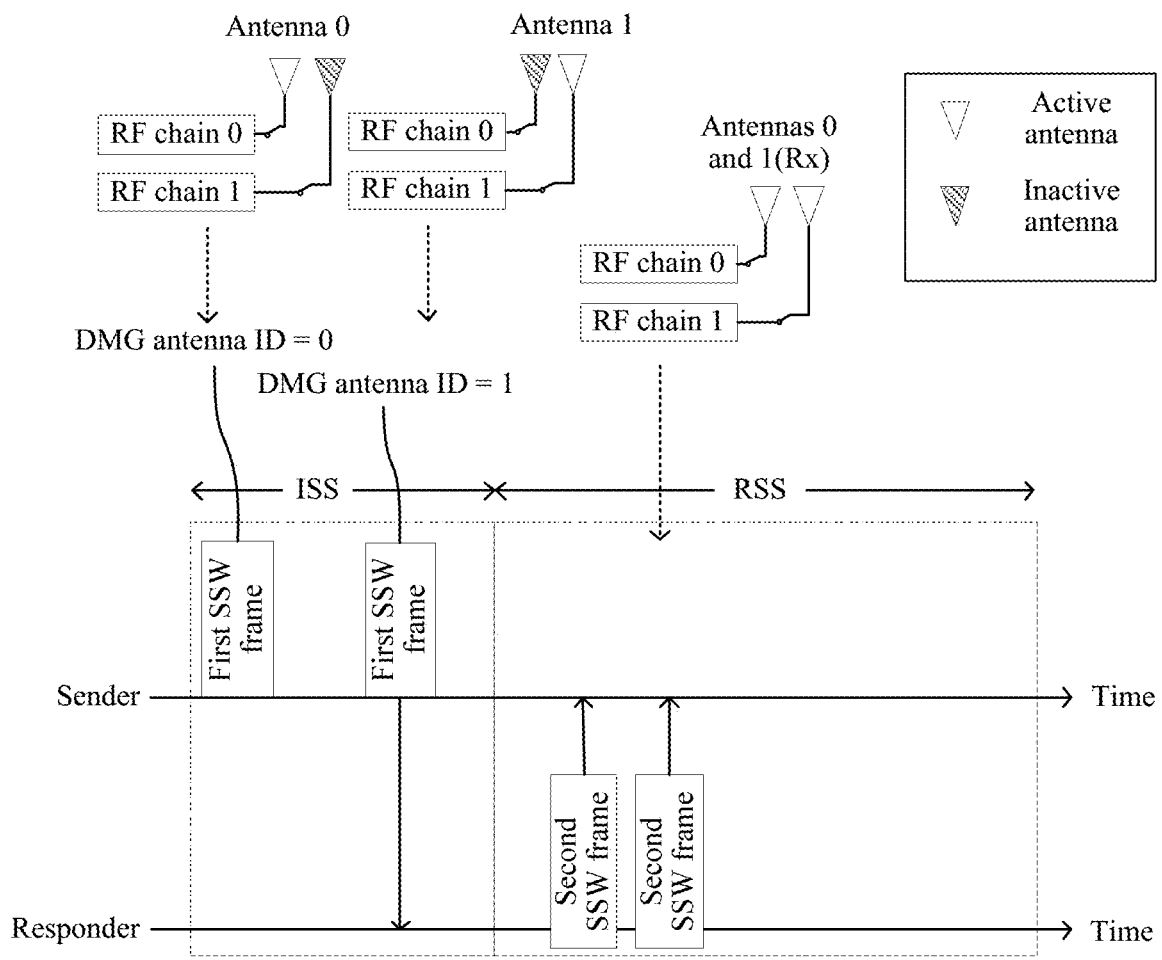

For example, as shown in FIG. 7, it is assumed that the initiator has antennas 0 and 1, a radio frequency chain 0, and a radio frequency chain 1. In the ISS phase, the initiator may be separately connected to the antennas 0 and 1 by using the radio frequency chains 0 and 1, to perform sector sweep-Sector Sweep. In FIG. 7, an active antenna is an antenna that is performing sending or receiving at a moment or an interval, and an inactive antenna is an antenna that is not performing sending or receiving at a moment or an interval.

S601 may be performed by the foregoing first sending unit 51.

S602: In the ISS process, a responder omnidirectionally receives the first SSW frame.

The responder configures an antenna of the responder as a pseudo omnidirectional directivity pattern for sending or receiving.

In an example, if a plurality of antennas of the responder each are connected to a radio frequency chain, the first SSW frame may be omnidirectionally received in the ISS process by using the plurality of antennas.

In another example, if the one radio frequency chain of the responder may be connected to at least one antenna, but only one antenna may be connected at a moment, it may be considered that after specific time of omnidirectional reception of each antenna, switching to another antenna for omnidirectional reception may be performed.

S602 may be performed by the foregoing second receiving unit 55.

S603: The responder determines a first SSW frame with best quality in the ISS phase and an optimal antenna of the responder.

As mentioned above, the first SSW frame may include one or more identifiers in the antenna, the sector, and the countdown value, and the responder may determine, based on the identifier, the first SSW frame with best quality.

Certainly, each first SSW frame is sent in different sector directions by each antenna of the initiator, therefore, an optimal sector of the initiator is determined, or an optimal antenna and an optimal sector of the initiator are determined while the first SSW frame with best quality is determined.

S603 may be performed by the foregoing second determining unit 56.

S604: In an RSS process, the responder sends the second SSW frame in different sector directions by using the optimal antenna of the responder.

In addition to carrying one or more identifiers in the antenna, the sector, or the countdown value of the responder, the second SSW frame further carries information used to indicate the first SSW frame with best quality in the ISS process. For example, the information may include a countdown value of the first SSW frame with best quality.

It should be noted that, a responder that does not have antenna transmission-reception reciprocity in negotiation may send the second SSW frame in different sector directions by using all antennas in the 604 step.

S604 may be performed by the foregoing second sending unit 54.

S605: In the RSS process, the initiator receives the second SSW frame in a parallel omnidirectional manner by using M antennas.

It should be noted that the M antennas used by the initiator to receive the second SSW frame include at least the foregoing m antennas.

For example, it is assumed that the initiator includes antennas 0 to 2. In the ISS phase, the initiator sends the first SSW frame by using antennas 0 and 1, and in the RSS phase, the initiator may receive the second SSW frame in a parallel omnidirectional manner by using the antennas 0 and 1, or may receive the second SSW frame in a parallel omnidirectional manner by using the antennas 0 to 2.

S605 may be performed by the foregoing first receiving unit 52.

S606: The initiator determines an optimal transmit beam in the ISS process based on the received second SSW frame.

A subsequent process (for example, sector sweep acknowledgment) is not described again.

S606 may be performed by the foregoing first determining unit 53.

In this embodiment, ISS and RSS are located in a same BI. In the RSS process, an SSW frame is received in a parallel manner by using a plurality of antennas (RF chains). This can effectively improve responder sector sweep efficiency and shorten sector sweep time in the RSS process. In addition, because a plurality of antennas simultaneously perform receiving, an effect of diversity reception and signal combination can be obtained, and therefore, robustness of sector sweep in the RSS process can be further improved.

Another embodiment is described below. In this embodiment, the initiator and the responder have not established a connection, and the responder attempts initial access. As in the previous embodiment, the initiator has a plurality of antennas and does not perform antenna switching in the RSS phase. In addition, the initiator may include one network device (for example, an AP), or may include a plurality of network devices. Therefore, the plurality of antennas of the initiator may belong to a same network node, or may separately belong to a plurality of network nodes.

Different from the foregoing embodiment, in this embodiment, the foregoing m antennas are classified into K sending groups, and each sending group may include one antenna or may include a plurality of antennas. The ISS phase spans over BTIs of K BIs (K is a positive integer greater than 1), and the RSS phase may occur in an A-BFT period of a $K^{th}$ BI.

Figure 8:
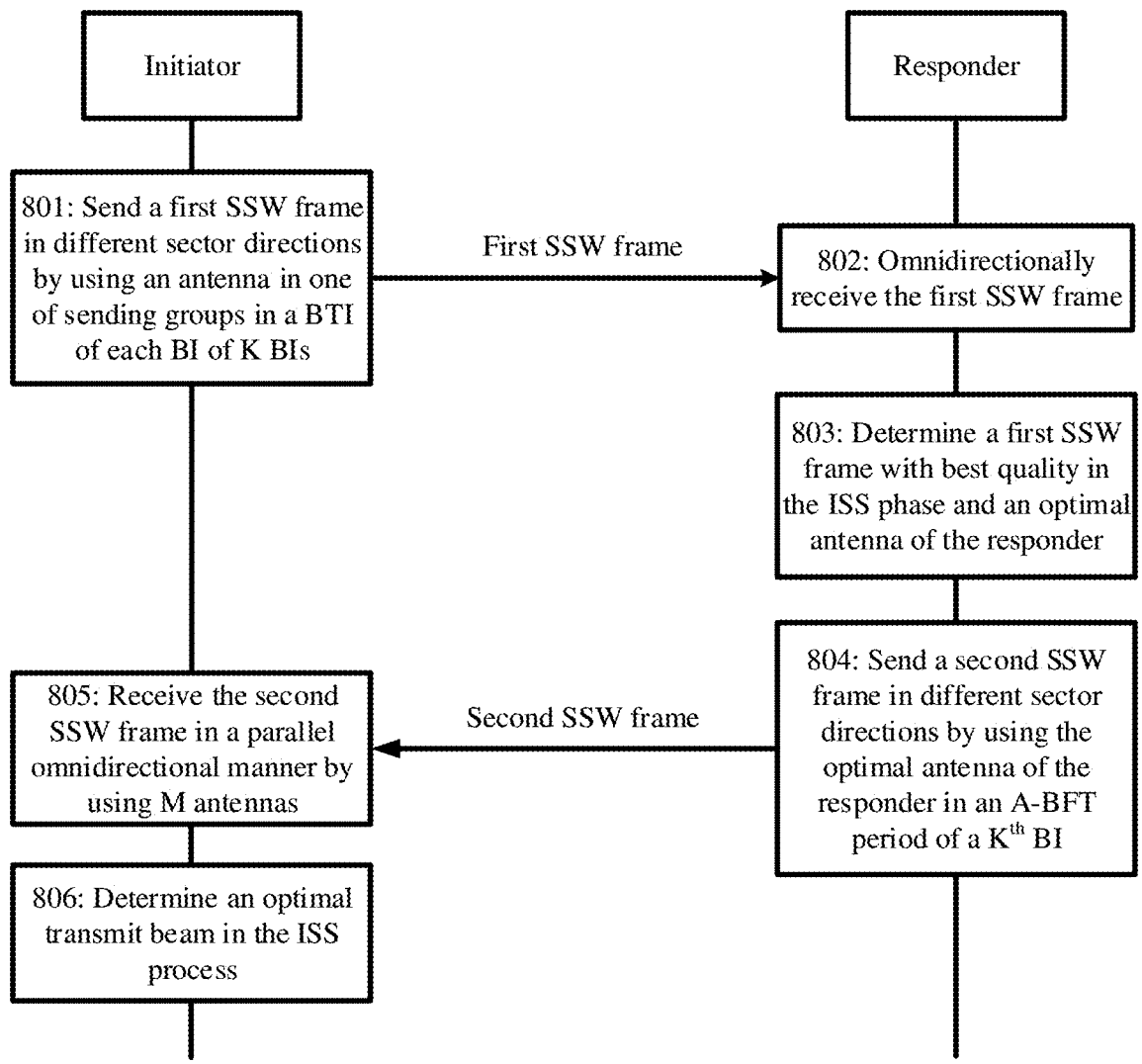

FIG. 8 shows another example interaction procedure of the foregoing BF training method, including the following steps.

1. ISS Phase:

S801: An initiator sends a first SSW frame (namely, a beacon frame) in different sector directions by using an antenna in one of sending groups in a BTI of each BI of K BIs.

Specifically, the K BIs are in a one-to-one correspondence with K sending groups, that is, a sending group used in any BI (in the K BIs) is different from a sending group used in another BI.

In an example, K=m. To be specific, in a BTI of each BI of the K BIs, the first SSW frame is sent in different sector directions by using one antenna.

Figure 9:
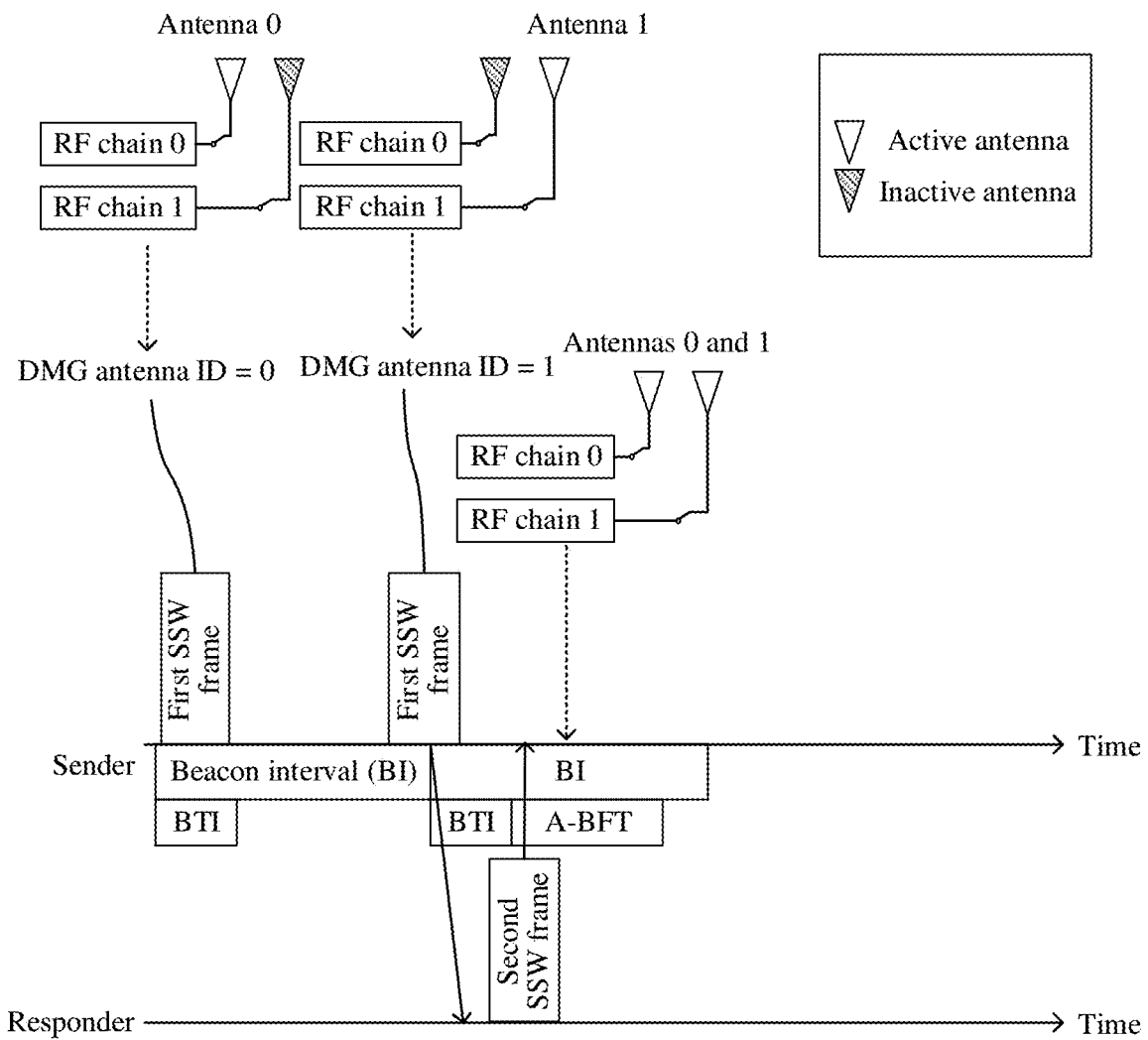

For example, referring to FIG. 9, it is assumed that the initiator has antennas 0 and 1, a radio frequency chain 0, and a radio frequency chain 1. In the ISS phase, the initiator may be separately connected to the antennas 0 and 1 by using the radio frequency chains 0 and 1, to perform sector sweep. In addition, in the first BI, the antenna 0 is an active antenna, and sends the first SSW frame in different sector directions. In the second BI, the antenna 1 is an active antenna, and sends the first SSW frame in different sector directions.

Figure 10:
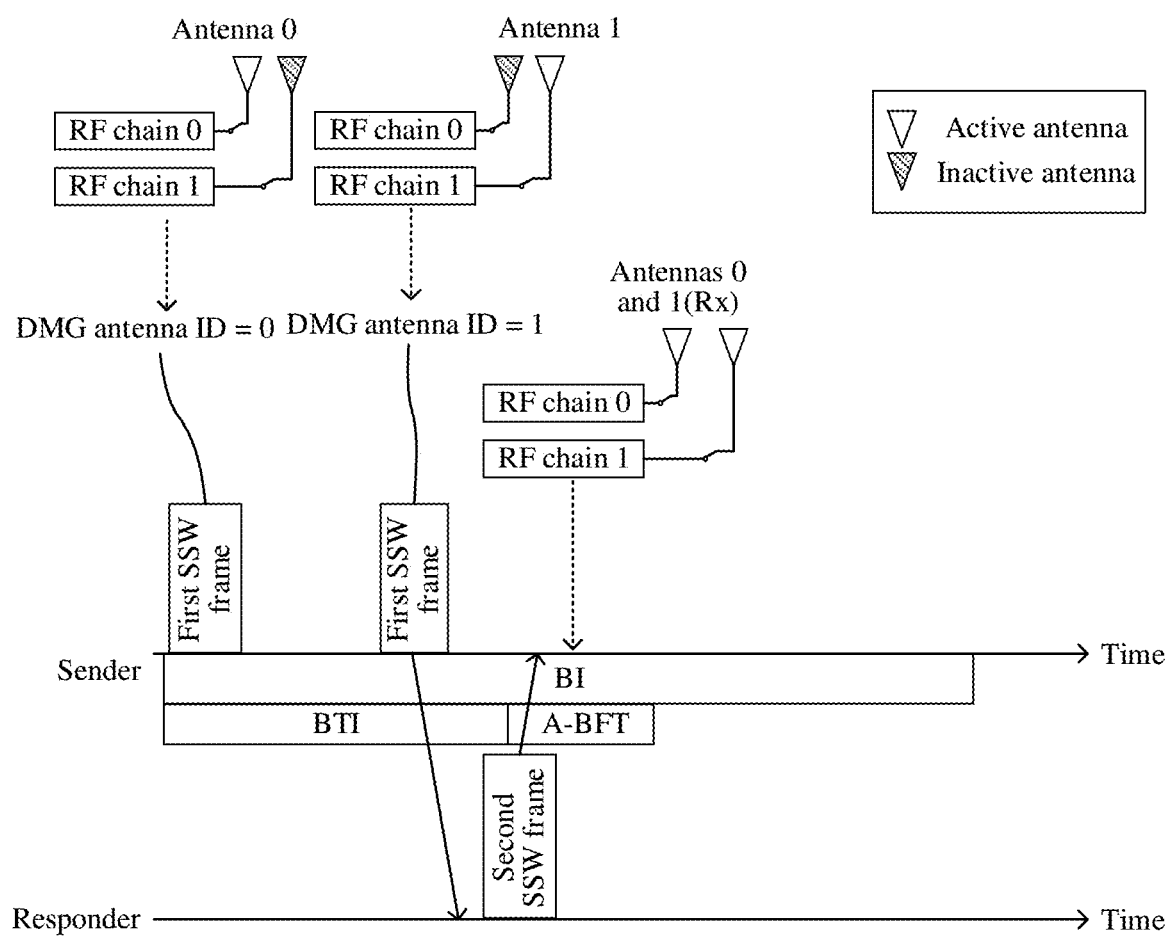

In another example, K may be less than m. For example, referring to FIG. 10, K may be equal to 1. In this case, the first SSW frame may be sent in different sector directions by sequentially using an antenna in the m antennas in a BI of one BTI. Alternatively, K may be another value, for example, m=4, and K=2. Details are not described herein again.

When a plurality of antennas are used for transmission in one BTI, each antenna may occupy different time periods (which may be referred to as a BTI subinterval) in the BTI.

S801 may be performed by the foregoing first sending unit 51.

S802: A responder omnidirectionally receives the first SSW frame.

S802 is similar to S602, and details are not described herein again.

S803: The responder determines a first SSW frame with best quality in the ISS phase and an optimal antenna of the responder.

The example shown in FIG. 9 is followed. Assuming that the initiator has the antennas 0 and 1, in this embodiment, the initiator needs to occupy BTIs of at least two BIs to transmit the first SSW frame. However, the first SSW frame may carry one or more identifiers in an antenna, a sector, and a countdown value. Therefore, the responder may know a quantity of BTIs of the BIs occupied in the ISS phase, and may calculate an end time of the ISS phase.

S803 may be performed by the foregoing second determining unit 56.

2. RSS Phase:

S804: The responder sends a second SSW frame in different sector directions by using the optimal antenna of the responder in an A-BFT period of a $K^{th}$ BI.

S804 may be performed by the foregoing second sending unit 54.

S805: The initiator receives the second SSW frame in a parallel omnidirectional manner by using M antennas in the A-BFT period of the $K^{th}$ BI.

S805 may be performed by the foregoing first receiving unit 52.

S806 is similar to S606, and details are not described herein again.

In the foregoing embodiment, if the initiator (for example, an AP) has a plurality of RF chains, in one BTI, it may be stipulated that each RF chain may maintain use of a same antenna, that is, the initiator does not switch an antenna in each RF chain in one BTI. Certainly, in one BTI, an implementation includes the following: The initiator may perform sending by using the plurality of RF chains in rotation, to send the first SSW frames in sequence. An optional implementation further includes the following: The initiator performs sending by using the plurality of RF chains, to superpose transmit power and enhance a signal.

Antennas used in the plurality of RF chains may be referred to as an antenna combination (for example, the foregoing sending group and receiving group), and optionally, the initiator may regularly schedule each antenna combination for sending.

In an A-BFT period, an antenna on each RF chain may be configured as a pseudo omnidirectional directivity pattern mode for simultaneous reception. Alternatively, in an A-BFT period, antennas used by the initiator are a plurality of antennas corresponding to antenna ID values used by the initiator in antenna ID subfields of Sector Sweep sector sweep fields of a plurality of beacon frames.

In addition, for compatibility purposes, in a same BTI, the plurality of antennas used by the initiator can share a same antenna identifier. Some responders may consider that the initiator performs sending by using only a single antenna within one BTI. In the same BTI, the plurality of antennas share the same antenna identifier to deceive a compatible station for implementation of compatibility.

Figure 11:
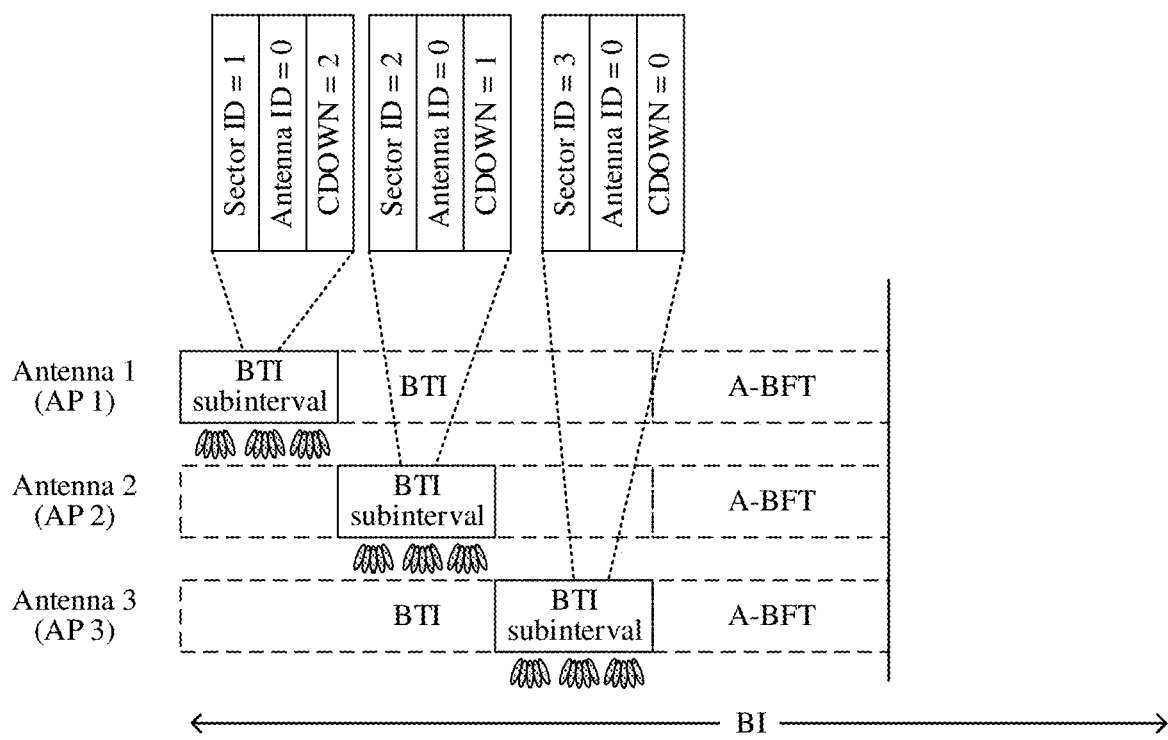
FIG. 11 is an example diagram of a case in which antenna identifiers are the same according to an embodiment of this application.

For example, referring to FIG. 11, it is assumed that antennas 1 to 3 are used in one BTI, and IDs of the antennas 1 to 3 are 0 to 2 respectively. In this case, antenna ID subfields of sector sweep fields of beacon frames sent by using the antennas 1 to 3 may be all 0.

In the RSS phase, the initiator may determine an optimal antenna and a corresponding sector for the responder based on an optimal best sector ID or a CDOWN value fed back in the A-BFT.

Alternatively, in another embodiment, in a same BTI, each antenna may also use its own antenna identifier. Because the responder may not receive frames sent by all antennas, it may be stipulated that each antenna uses its own antenna identifier.

In this embodiment, the ISS phase spans over a plurality of BIs, and training time in this embodiment is longer than that in the foregoing embodiment. However, for each BI period, a length of a BTI is not significantly increased. In addition, in the RSS process, an SSW frame is received in a parallel manner by using a plurality of antennas (RF chains), thereby effectively improving responder sector sweep efficiency and shortening sector sweep time in the RSS process. In addition, because a plurality of antennas simultaneously perform receiving, an effect of diversity reception and signal combination can be obtained, and therefore, robustness of sector sweep in the RSS process can be further improved.

In another embodiment of this application, multiple-input multiple-output (MIMO) transmission may further be performed in one BI by using an antenna set including a primary antenna. The primary antenna includes an antenna that sends the first SSW frame in a BTI of the BI.

To be specific, the AP cannot change a primary DMG antenna in one BTI. For example, the AP is the initiator. The primary DMG antenna is an antenna used by the AP to send a beacon frame in the BTI, and the AP may perform MIMO transmission by using the primary antenna and another antenna.

For example, if the AP uses the antenna 0 in the BTI, the antenna 0 is referred to as the primary antenna. An antenna set that includes the antenna 0 is used for all transmission in a BI that includes the BTI.

For another example, if the AP uses the antennas 0 and 1 in the BTI, the antennas 0 and 1 are referred to as the primary antenna. An antenna set that includes the antennas 0 and 1 is used for all transmission in a BI that includes the BTI.

For another example, the AP uses the antennas 0 and 1 in the BTI, and the AP designates the antenna 0 in the antennas 0 and 1 as the primary antenna. In this case, an antenna set that includes the antenna 0 is used for all transmission in a BI that includes the BTI.

Figure 12:
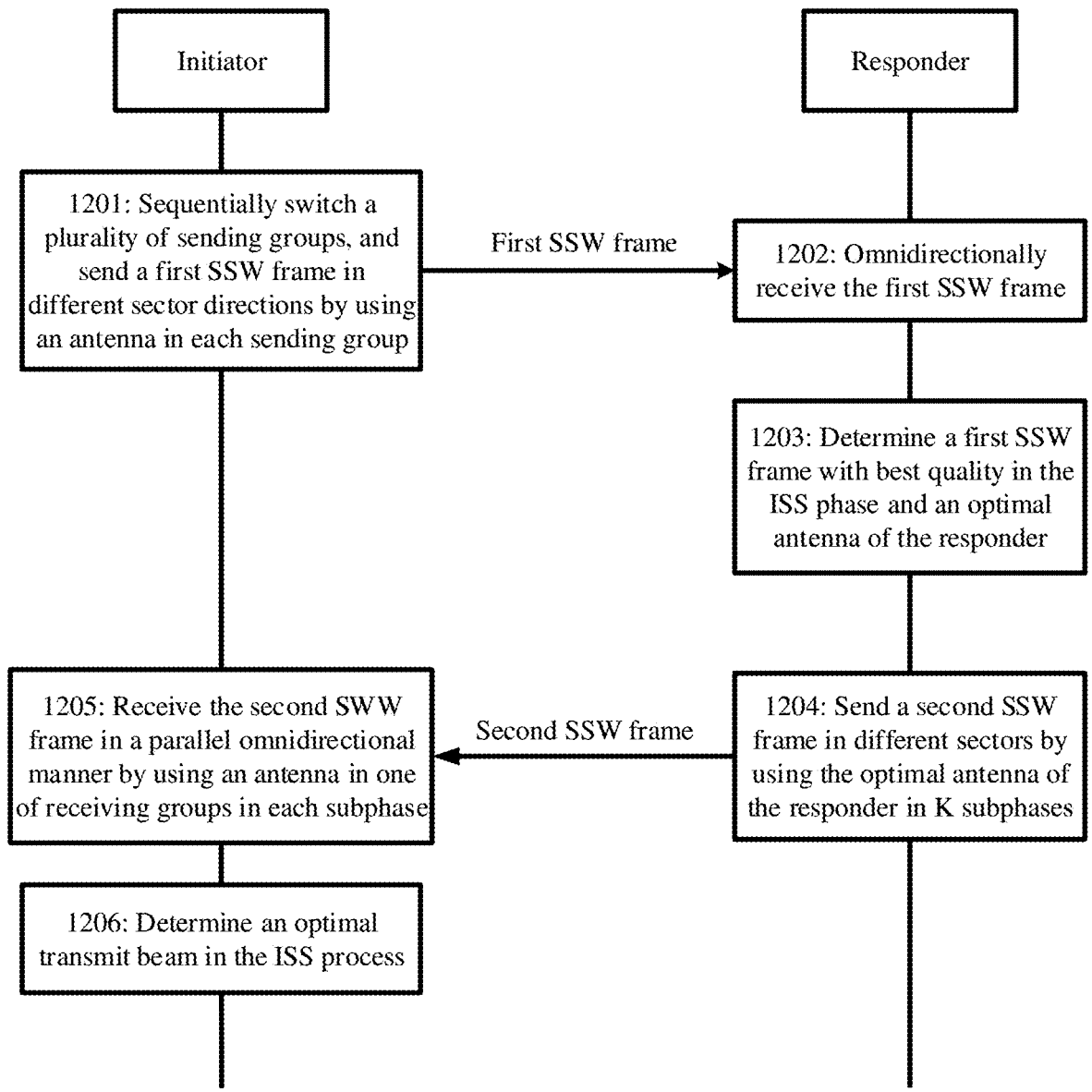

FIG. 12 shows another example interaction procedure of the foregoing BF training method. In this embodiment, an RSS process is divided into K subphases. The foregoing m antennas are classified into K sending groups, and each sending group may include one antenna or may include a plurality of antennas. The foregoing M antennas are classified into K receiving groups, each receiving group includes at least one antenna, and at least one group includes two or more antennas. A value of K may be determined by negotiation between an initiator and a responder, or the responder may be notified of the value of K by the initiator.

It should be noted that antenna switching is performed in this embodiment.

The interaction procedure may include the following:

1. ISS Phase:

S1201: The initiator sequentially switches a plurality of sending groups, and sends a first SSW frame (namely, a beacon frame) in different sector directions by using an antenna in each sending group.

In an example, the K sending groups may be switched in a same BI. It is assumed that the initiator has radio frequency chains 0 and 1 and antennas 0 to 3. In this case, in the ISS phase, the initiator may separately connect to the antenna 0 and the antenna 2 by using the radio frequency chains 0 and 1, to perform transmit sector sweep. The antenna 0 and the antenna 2 form a sending group. Then, the initiator switches an antenna connected to a radio frequency chain, and stipulates that the radio frequency chains 0 and 1 are separately connected to the antenna 1 and the antenna 3 for transmit sector sweep. The antenna 1 and the antenna 3 form another sending group.

Certainly, from a perspective of the responder, the first SSW frame is sent in different sector directions by sequentially using the antennas 0 to 3.

S1201 may be performed by the foregoing first sending unit 51.

S1202 and S1203 are similar to S802 and S803, and details are not described herein again.

2. RSS Phase:

S1204: The responder sends a second SSW frame in different sectors by using an optimal antenna of the responder in the K subphases.

Because there are K subphases in total, the responder repeats K times of transmit sector sweep.

S1204 may be performed by the foregoing second sending unit 54.

S1205: The initiator receives the second SSW frame in a parallel omnidirectional manner by using an antenna in one of the receiving groups in each subphase.

A receiving group used in any subphase is different from a receiving group used in another subphase, that is, the K subphases are in a one-to-one correspondence with the K receiving groups.

Figure 13:
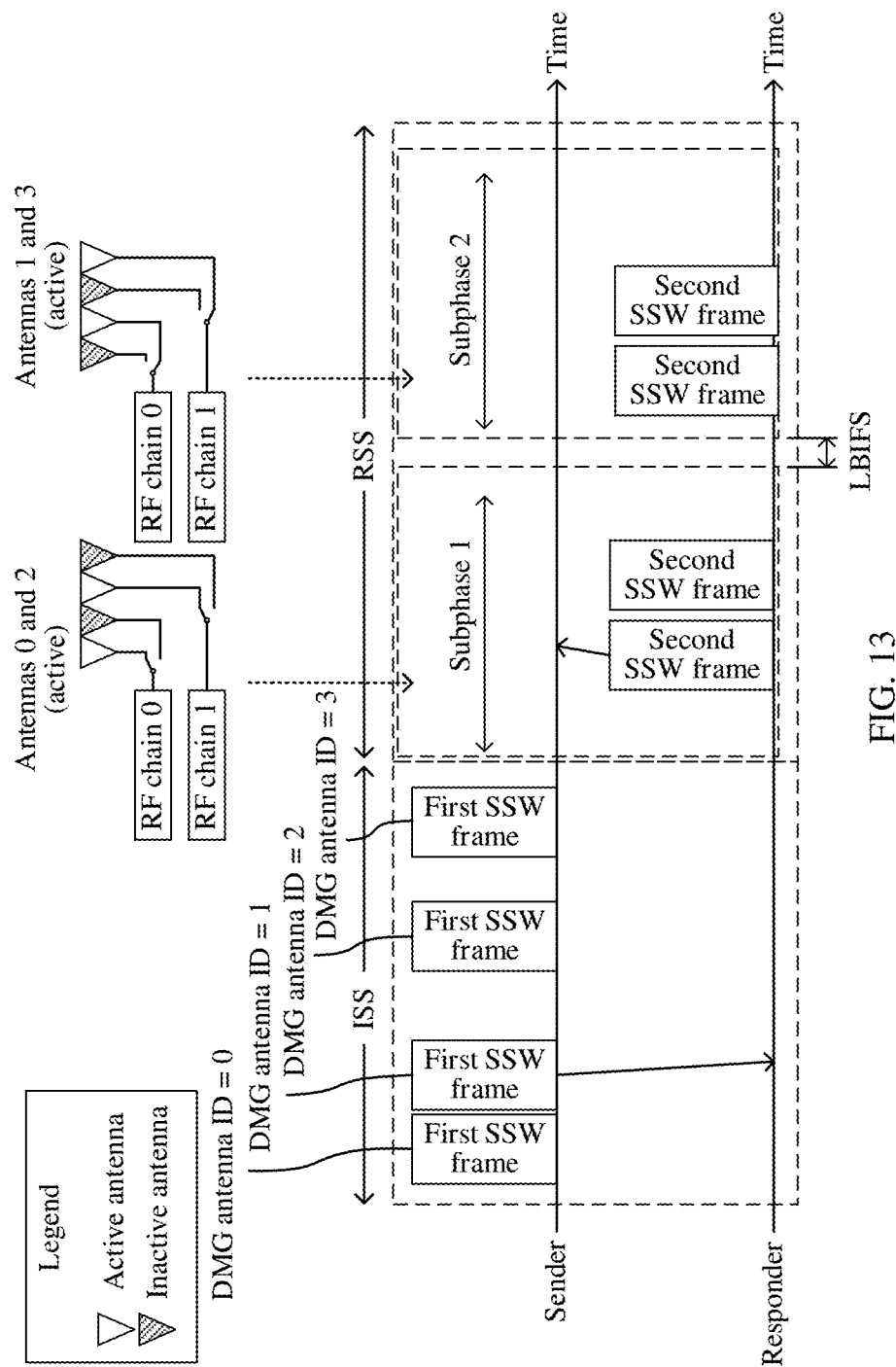

The foregoing example is followed. Referring to FIG. 13, in a subphase 1 of RSS phase, a radio frequency chain 0 and a radio frequency chain 1 may be used to separately connect to an antenna 0 and an antenna 2 for omnidirectional reception. In a subphase 2, the radio frequency chain 0 and the radio frequency chain 1 are used to separately connect to the antenna 1 and an antenna 3 for omnidirectional reception.

One LBIFS may be separated between subphases to facilitate antenna switching. S1205 may be performed by the foregoing first receiving unit 52.

S1206 is similar to S606, and details are not described herein again.

It should be noted that, in an example, the ISS phase in this embodiment may occur in a non-BTI interval.

In another example, the ISS phase may alternatively occur in one BTI, and a sending group may be switched in one BTI. Correspondingly, the RSS phase occurs in an A-BFT period of a same BI, that is, a receiving group is switched in the A-BFT period.

Figure 14A:
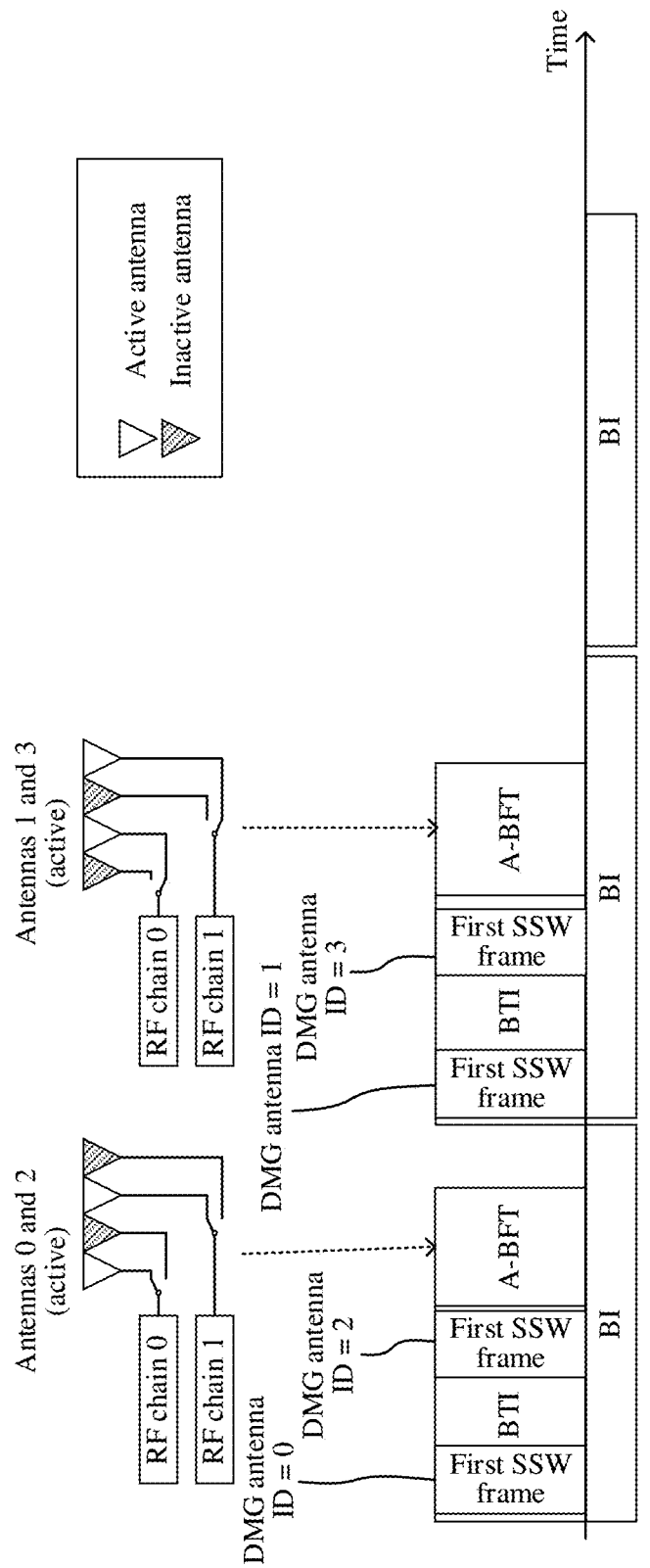

Alternatively, in still another example, referring to FIG. 14*a*, an ISS phase and an RSS phase span over a plurality of BIs, and the initiator does not perform antenna switching in an A-BFT phase of one BI. In this case, the K subphases of the RSS phase may occur in K A-BFT periods.

Antennas used in the plurality of RF chains may be referred to as an antenna combination (for example, the foregoing sending group and receiving group), and optionally, the initiator may regularly schedule each antenna combination for sending. The initiator may traverse a plurality of A-BFT periods, and one combination of the antenna combinations is used in each A-BFT period.

Alternatively, in still another example, the ISS phase spans over BTIs of K BIs, and the RSS phase occurs in an A-BFT period of a $K^{th}$ BI, that is, receiving group switching is performed in one A-BFT period.

Alternatively, in still another example, in the RSS phase, the initiator may switch an antenna combination every L A-BFT allocations, where L is a value of N A-BFT subfields used by each antenna in a beacon interval control field.

Figure 14B:
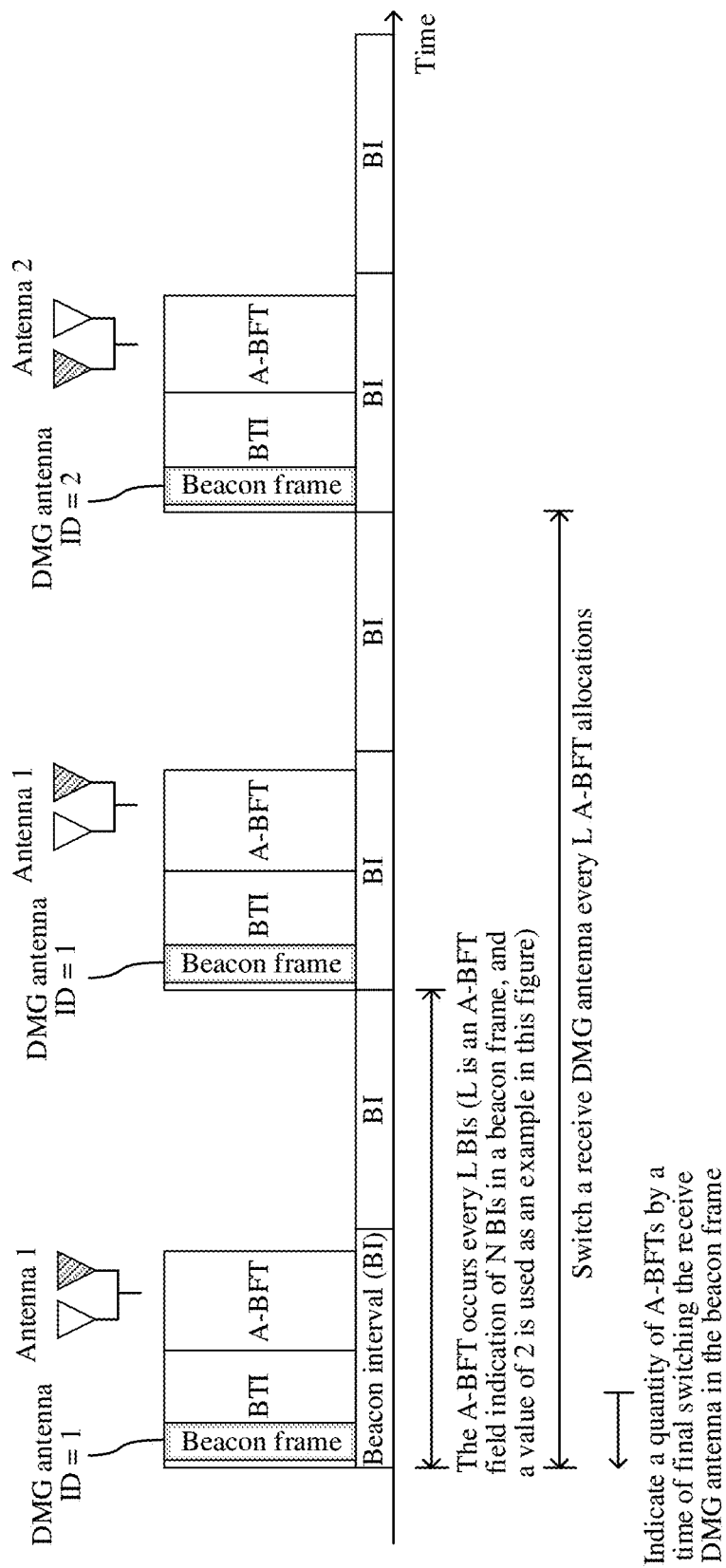

L is related to a total quantity of sectors of the initiator in the ISS phase and a quantity of beacon frames that can be transmitted in each BTI. For example, it is assumed that a total quantity of sectors of the initiator is 20, and a maximum of 10 beacon frames can be transmitted in one BTI. In this case, the ISS phase needs to be completed by using two BIs. In this case, L=2. Referring to FIG. 14*b*, in an RSS phase, a responder performs antenna switching every two ABFT periods.

In another embodiment of this application, in a scenario in which ISS occurs in a non-BTI interval, if the responder also has a plurality of RF chains, the following operations may be performed:

The initiator includes a field of a total quantity of sectors of the ISS in a sector sweep feedback field or another field of the first SSW frame. The total quantity of sectors can be used by the responder to determine when to switch an antenna.

In an example, the total quantity of sectors may be obtained by using the following calculation method: a sum of quantities of sectors used by all antennas in the ISS phase is multiplied by a value of a maximum quantity of switched antennas (or may be referred to as a quantity of training antennas) required in a plurality of RF chains of the responder, where an obtained product is the total quantity of sectors.

For example, the responder has two RF chains, one may be connected to two antennas, and the other one may be connected to three antennas. In this case, a maximum quantity of switched antennas of the responder is 3. It is assumed that the sum of quantities of sectors used by all antennas in the ISS phase is 20. In this case, the total quantity of sectors is 60.

The quantity of switched antennas is as follows: For example, when one RF chain needs to be connected to two antennas for training, one of the two antennas may be selected for switching. It may be specifically specified in a protocol that a quantity of switched antennas is 2 or a quantity of switching times is 1. This does not cause ambiguity.

The responder may carry, by using a value in a field of a quantity of receive antennas negotiated recently by the responder, a value or information expression of a maximum quantity of switched antennas required in a plurality of RF chains of the responder.

In another example, if all RF chains of the responder have a same quantity of switched antennas (or quantity of training antennas), the total quantity of sectors of the ISS is obtained by using the following calculation method multiplying a sum of quantities of sectors used by all antennas in the ISS phase by a value of a quantity of switched antennas (or a quantity of training antennas) required in a plurality of RF chains of the responder, where an obtained product is the total quantity of sectors.

The quantity of switched antennas may be obtained by negotiation between the initiator and the responder.

Figure 15:
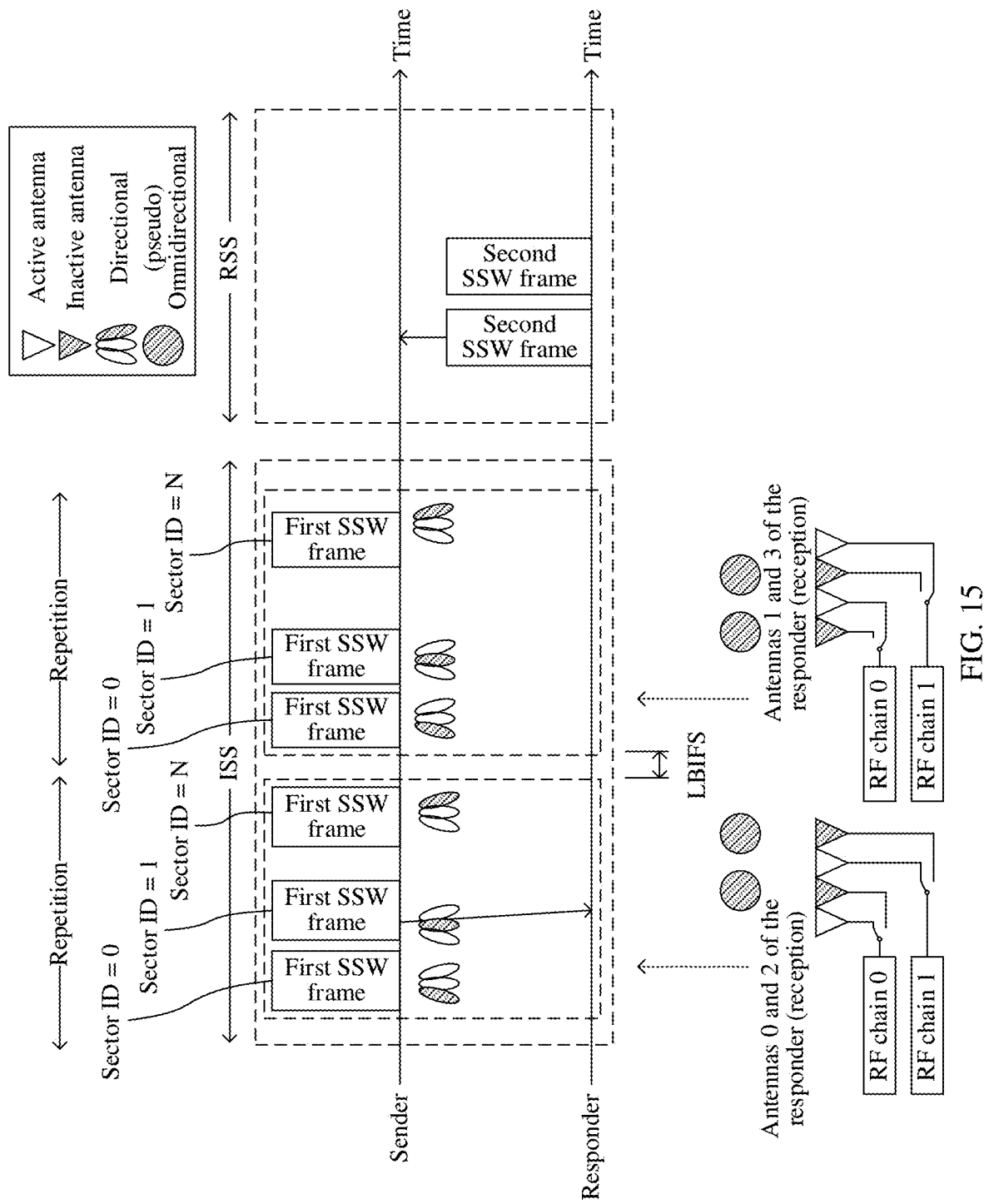

In addition, if the ISS is outside the BTI, and at least one RF chain of the responder needs to train more than one antenna, or each RF chain needs to train more than one antenna, referring to FIG. 15, the initiator repeats sector sweep in the ISS for a plurality of times. A quantity of repetition times of the initiator is the value in a field of a quantity of receive antennas negotiated recently by the responder.

However, if a plurality of RF chains of the responder need to train more than one antenna, antenna switching needs to be simultaneously performed for the plurality of RF chains in the ISS, and repeated sector sweep may be performed at an interval of an LBIFS during switching.

At the beginning of the ISS, the responder may configure a plurality of antennas on the plurality of RF chains in a pseudo omnidirectional directivity pattern mode and maintain the pseudo omnidirectional directivity pattern mode in a specified time interval. The length of the specified time interval is a product of the total quantity of sectors negotiated recently by the initiator and a sum of transmission time of a single SSW frame plus a corresponding IFS interval (for example, an SBIFS, an LBIFS, or the like defined in the protocol). In a next specified time interval after the specified time interval, the responder can switch the RF chain to another antenna configured in the pseudo omnidirectional directivity pattern mode.

In an existing manner, when repeated sector sweep (antenna switching) is performed in the ISS or the RSS, the LBFIS needs to be used during antenna switching, and an interframe space at another time is the SBIFS. To ensure that CDOWNs declines at a relatively continuous and uniform rate from a perspective of a receiver, a CDOWN field is increased by 2 each time the LBIFS interval needs to be used. Duration of the LBIFS is equal to transmission time of one SSW frame plus time of two SBIFSs.

When a length of a single SSW frame is shorter, transmission time of one SSW frame plus two SBIFSs is not sufficient to perform antenna switching. In this case, two SSW frames are required for antenna switching instead of using for sending. Therefore, antenna switching may waste time to some extent.

Figure 16:
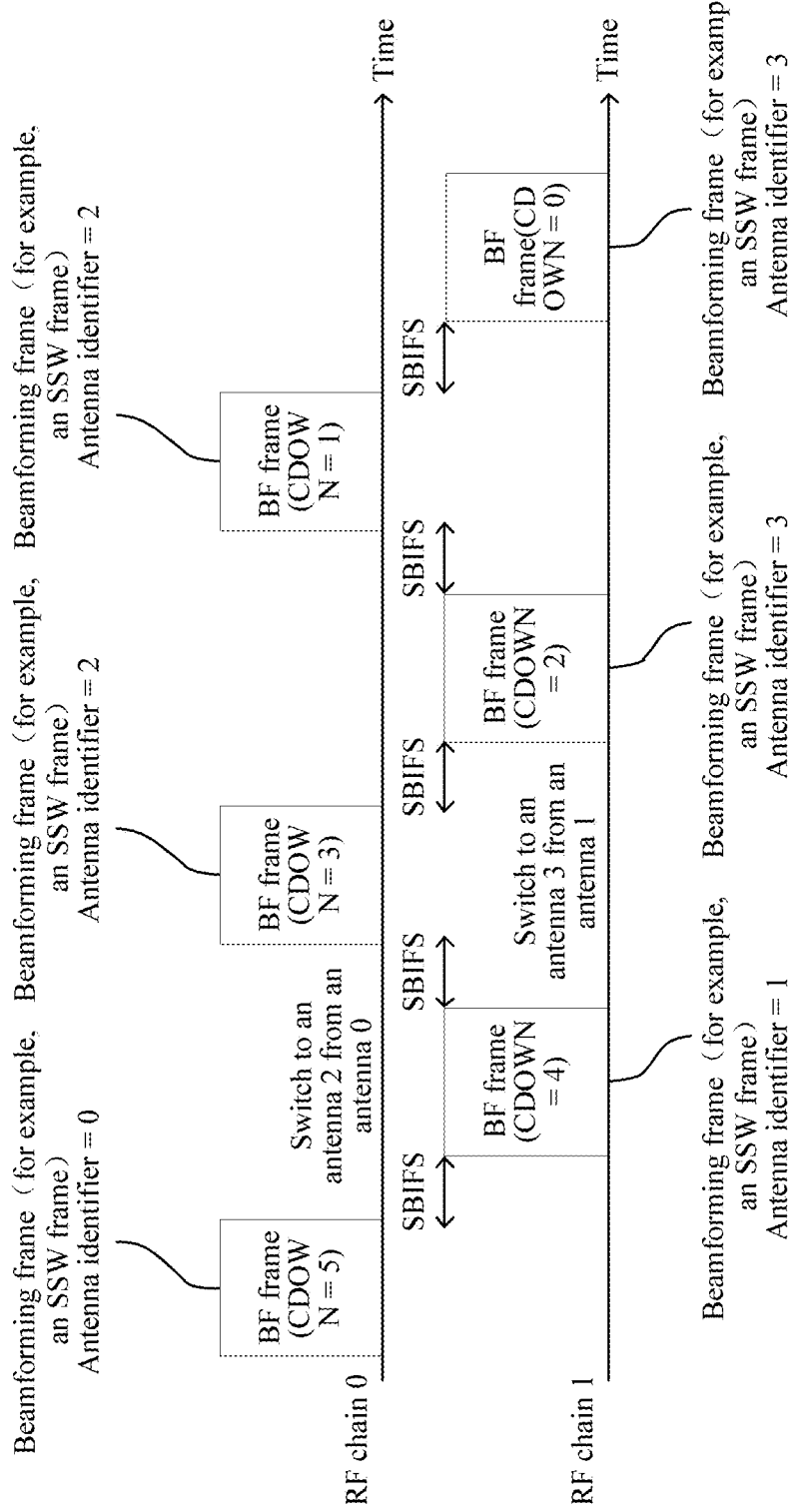
Figure 17:
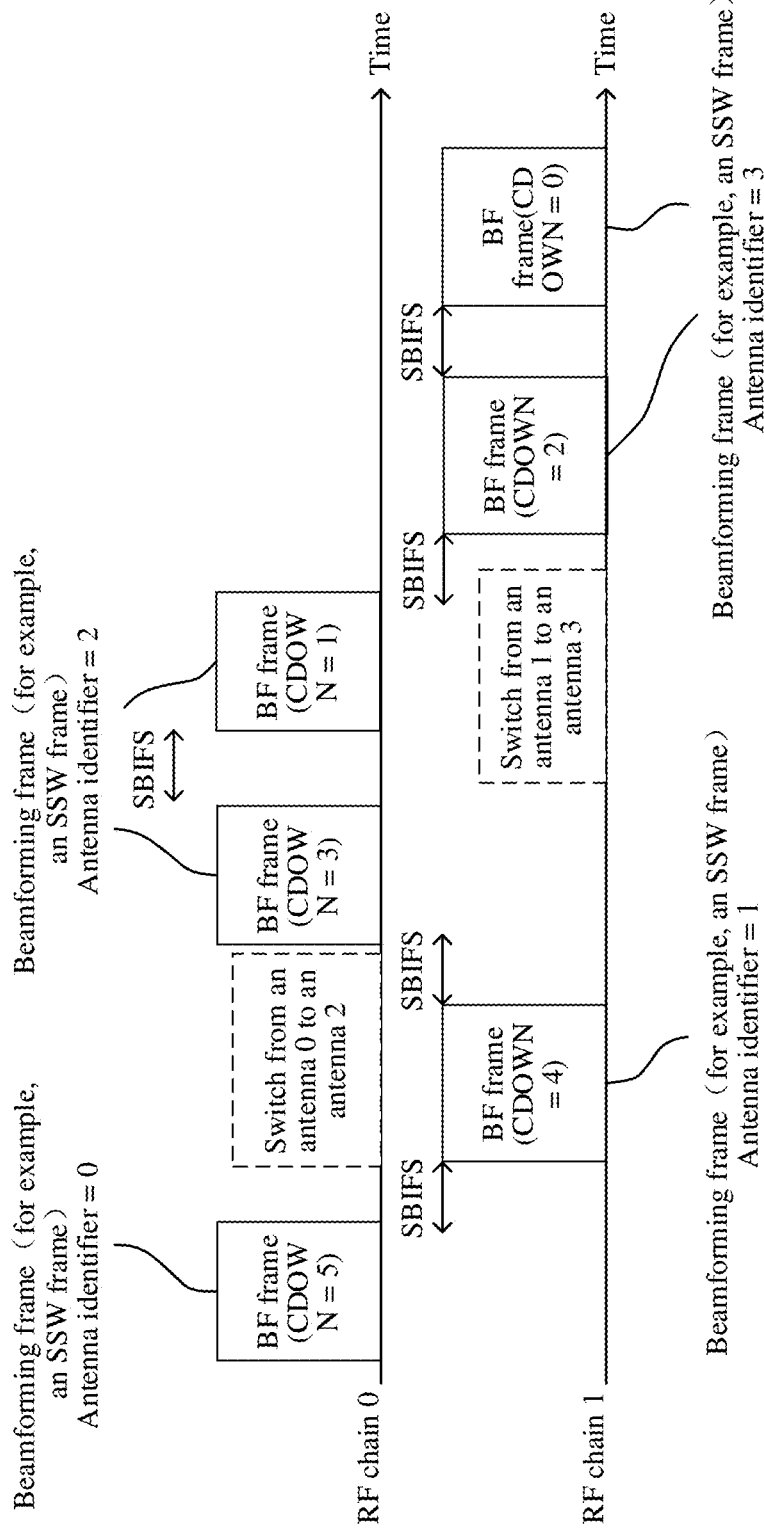

This embodiment of this application may provide a new switching manner, to shorten switching time. Referring to FIG. 16 or FIG. 17, switching may be performed in the following manner:

Phase A: A target RF chain sends the first SSW frame in different sector directions by connecting to a first antenna.

For ease of description, any RF chain of the initiator or responder may be referred to as the target RF chain. In FIG. 16 and FIG. 17, an RF chain 0 may be considered as the target RF chain, and for example, the first antenna is an antenna 0.

Phase B: After waiting for the SBIFS, a second antenna connected to another RF chain sends the first SSW frame in different sector directions.

In FIG. 16 and FIG. 17, after the RF chain 0 sends the first SSW frame (marked by CDOWN=5 in the figures) by using the antenna 0, another RF chain (for example, an RF chain 1) sends the first SSW frame after waiting for the SBIFS.

Phase C: Within a period in which the second antenna sends the first SSW frame, the target RF chain switches and connects to a third antenna.

The phase C and the phase B coincide in terms of time. In FIG. 16, when the RF chain 1 sends the first SSW frame (marked by CDOWN=4 in the figure), the RF chain 0 performs antenna switching and switches to an antenna 2.

Phase D: After the first SSW frame is sent in different sector directions by using the second antenna, the first SSW frame is sent in different sector directions by using the third antenna connected to the target RF chain after the third antenna waits for the SBIFS.

For example, referring to FIG. 16, after the RF chain 0 is switched from the antenna 0 to the antenna 2, the RF chain 1 sends the first SSW frame (marked by CDOWN=4 in the figure). After waiting for this, the SBIFS is waited. Then, the RF chain 0 resumes sending.

Switching of the RF chain 1 is also similar to switching of the RF chain 0. Details are not described herein again.

It should be noted that FIG. 16 and FIG. 17 are different. In the embodiment shown in FIG. 16, the first SSW is alternately sent by a plurality of RF chains. Therefore, for each RF chain, CDOWNs of the first SSW frame sent by the RF chain are discontinuous, and are odd numbers or even numbers.

In FIG. 17, antennas are increased progressively in a numbering manner (certainly, may be decreased progressively). After an antenna is switched, the first SSW frame is consecutively sent by using the switched antenna.

It can be learned that in the switching manner provided in this embodiment of this application, there is only the SBIFS, and the LBIFS no longer needs to be waited for, thereby reducing a waste of time caused by antenna switching of an RF chain.

This application may also be applied to a case in which another antenna training sequence is used in an embodiment, including but not limited to a progressive increase or a progressive decrease in antenna numbers, or a progressive increase or a progressive decrease in numbers of antennas trained on a single RF chain.

In this application, a process in which the initiator performs transmit sector sweep and the responder performs receiving in the ISS is similar to a process in which the responder performs transmit sector sweep and the initiator performs receiving in the RSS. In implementation, the responder and the initiator in the RSS may refer to training behavior of the initiator and the responder in the ISS.

As mentioned above, the plurality of antennas of the initiator may belong to a same network node, or may separately belong to a plurality of network nodes. In other words, the initiator may include one network node (for example, an AP), or may include a plurality of network nodes.

Figure 18:
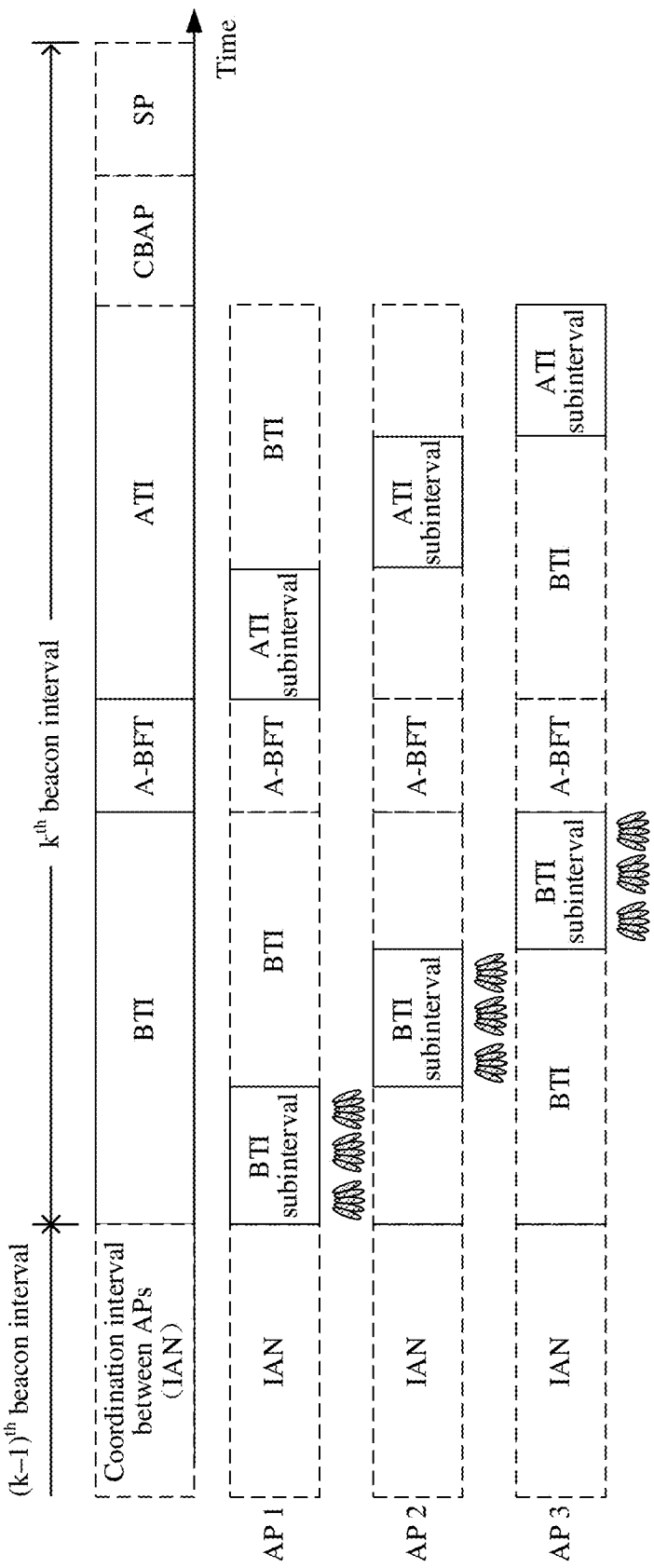
FIG. 18 is an example diagram of negotiation by a plurality of network devices according to an embodiment of this application.

When there are a plurality of network nodes, a coordination interval may be configured within at least one BI, for example, an IAN shown in FIG. 18. When the initiator includes a plurality of APs, an inter-AP coordination interval (represented by the IAN in FIG. 18) may be configured within at least one BI.

A plurality of network devices may negotiate, in the coordination interval, at least one of an antenna identifier, a countdown value, a sector identifier, a BTI subinterval occupied by each network device, an A-BFT subinterval occupied by each network device, and an ATI subinterval occupied by each network device.

For example, referring to FIG. 18, APs 1 to 3 may coordinate the following in the coordination interval.

The AP 1 uses antenna ID=0, the AP 2 uses antenna ID=1, and the AP 3 uses antenna ID=2, so that a STA can distinguish between different APs by using antenna IDs.

Alternatively, the AP 1 uses CDOWN=29 to CDOWN=20, the AP 2 uses CDOWN=19 to CDOWN=10, and the AP 3 uses CDOWN=9 to CDOWN=0, so that CDOWN values observed by a STA are continuous.

Coordination between the plurality of network devices usually occurs before the ISS. In this case, a coordination interval may be correspondingly prior to a BTI.

Optionally, a beacon frame sent by a different antenna may indicate a start time of a corresponding A-BFT subinterval, or a start time of a corresponding ATI subinterval, or may indicate a start time of a subinterval occupied by another interval.

In another embodiment, one BI may include one or more coordination intervals. If one BI includes a plurality of coordination intervals, different content may be negotiated in different coordination intervals. For example, before an ATI, a negotiation interval may be configured to negotiate an ATI subinterval used by each antenna or each network device. A person skilled in the art may design flexibly, and details are not described herein.

In addition, it should be noted that a coordination interval may be set in each BI, or a coordination interval may be set every several BIs. A person skilled in the art may design flexibly, and details are not described herein.

In addition, for compatibility purposes, in a same BTI, the plurality of antennas used by the initiator can share a same antenna identifier. Some responders may consider that the initiator performs sending by using only a single antenna within one BTI. In the same BTI, the plurality of antennas share the same antenna identifier to deceive a compatible station for implementation of compatibility.

For example, referring to FIG. 11, it is assumed that antennas 1 to 3 are used in one BTI, and IDs of the antennas 1 to 3 are 0 to 2 respectively. In this case, antenna ID subfields of Sector Sweep sector sweep fields of beacon frames sent by using the antennas 1 to 3 may be all 0.

In the RSS phase, the initiator may determine an optimal antenna and a corresponding sector for the responder based on an optimal best sector ID or a CDOWN value fed back in the A-BFT.

Alternatively, in another embodiment, in a same BTI, each antenna may also use its own antenna identifier. Because the responder may not receive frames sent by all antennas, it may be stipulated that each antenna uses its own antenna identifier.

Method or algorithm steps described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to the processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by using hardware, software, firmware, or any combination thereof. When implemented by software, the foregoing functions may be stored in a computer readable medium or transmitted as one or more instructions or code in the computer-readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, improvement, or the like made based on technical solutions of this application shall fall within the protection scope of this application.

What is claimed is:

1. A method comprising:
performing, by an initiator, an initiator sector sweep (ISS) process, the ISS process comprises sending first Sector Sweep (SSW) frames in different sector directions sequentially through m antennas, wherein the different sector directions correspond to different beams, the initiator has N antennas, and 1≤m≤N;
performing, by the initiator, a responder sector sweep (RSS) process, the RSS process comprises receiving second SSW frames in a parallel omnidirectional manner through M antennas, wherein each of the second SSW frames is sent in the different sector directions by a responder, each of the second SSW frames carries information indicating a best SSW frame of the first SSW frames with a best quality in the ISS process, and the M antennas comprise the m antennas; and
determining, by the initiator, an optimal transmit beam in the ISS process according to the second SSW frames.

2. The method according to claim 1, wherein:
the ISS process spans K beacon intervals (BIs), the m antennas are classified into K sending groups, each of the K sending groups comprises an antenna, and K is a positive integer greater than 1; and
sending the first SSW frames in the different sector directions sequentially through the m antennas comprises:
sending each of the first SSW frames in a respective BI of the K BIs through an antenna in a respective sending group of the K sending groups, wherein a sending group used in any BI of the K BIs is different from a sending group used in another BI of the K BIs.

3. The method according to claim 1, wherein:
the RSS process comprises K subphases, the M antennas are classified into K receiving groups, each of the K receiving groups comprises an antenna, and a first receiving group of the K receiving groups comprises two antennas; and
receiving the second SSW frames in the parallel omnidirectional manner through the M antennas comprises:
receiving each of the second SSW frames in a respective subphase through an antenna in a respective one of the K receiving groups, wherein a receiving group of the K receiving groups used in any subphase of the K subphases is different from a receiving group of the K receiving group used in another subphase of the K subphases, and each of the second SSW frames is sent by the responder in the different sector directions in the K subphases.

4. The method according to claim 3, wherein the ISS process spans beacon transmission intervals (BTIs) of K beacon intervals (BIs).

5. The method according to claim 4, wherein the K subphases span association beamforming training (A-BFT) periods of the K BIs, and antennas used in a BTI and an A-BFT period of a same BI of the K BIs overlap and are not switched.

6. The method according to claim 1, wherein:
in a same beacon transmission interval (BTI), a plurality of antennas used by the initiator share a same antenna identifier; or
in a same BTI, the plurality of antennas use antenna identifiers of the plurality of antennas.

7. The method according to claim 1, further comprising:
performing multiple-input multiple-output (MIMO) transmission in a beacon interval (BI) through an antenna set comprising a primary antenna, wherein the primary antenna comprises an antenna that sends a SSW frame of the first SSW frames in a beacon transmission interval (BTI) of the BI.

8. The method according to claim 1, wherein:
the initiator has n radio frequency (RF) chains, n is a positive integer greater than 1, and a connection relationship between the N antennas and the n RF chains is capable of being dynamically configured; and
when a target RF chain of the n RF chains switches to a different antenna to send the first SSW frames, sending the first SSW frames comprises:
sending, by the target RF chain, a first SSW frame of the first SSW frames through a first antenna;
sending, by a second antenna connected to a second RF chain different from the target RF chain, a second SSW frame of the first SSW frames after waiting for a short beamforming interframe space (SBIFS);
switching and connecting, by the target RF chain, to a third antenna while the second antenna sends the second SSW frame of the first SSW frames; and
after the second antenna sends the second SSW frame of the first SSW frames, sending, by the third antenna connected to the target RF chain, a third SSW frame of the first SSW frames after waiting for the SBIFS.

9. A method, comprising:
performing, by a responder, an initiator sector sweep (ISS) process, wherein the ISS process comprises omnidirectionally receiving first Sector Sweep (SSW) frames, wherein the first SSW frames are sent, by an initiator, in different sector directions sequentially through m antennas, the different sector directions correspond to different beams, 1≤m≤N, and N is a quantity of antennas of the initiator;
determining, by the responder, a best SSW frame of the first SSW frames with a best quality in the ISS process and an optimal antenna of the responder; and
performing, by the responder, a responder sector sweep (RSS) process, wherein the RSS process comprises sending second SSW frames in different sector directions through the optimal antenna, wherein the second SSW frame carries information indicating the best SSW frame, and the best SSW frame is further used by the initiator to determine an optimal transmit beam in the ISS process, and the second SSW frames are received in a parallel omnidirectional manner by the initiator through M antennas.

10. An apparatus, comprising:
a processor; and
a non-transitory computer-readable storage medium storing a program to be executed by the processor, the program including instructions for:
performing an initiator sector sweep (ISS) process, the ISS process comprises sending first Sector Sweep (SSW) frames in different sector directions sequentially through m antennas, wherein the different sector directions correspond to different beams, the apparatus has a total of N antennas, and 1≤m≤N;
performing a responder sector sweep (RSS) process, the RSS process comprises receiving second SSW frames in a parallel omnidirectional manner through M antennas, wherein each of the second SSW frames is sent in the different sector directions by a responder, each of the second SSW frames carries information indicating a best SSW frame of the first SSW frames with a best quality in the ISS process, and the M antennas comprise the m antennas; and determining an optimal transmit beam in the ISS process according to the second SSW frames.

11. The apparatus according to claim 10, wherein:
the ISS process spans K beacon intervals BIs, the m antennas are classified into K sending groups, each of the K sending groups comprises an antenna, and K is a positive integer greater than 1; and
the instructions for sending the first SSW frames comprise further instructions for:
sending each of the first SSW frames in a respective BI of the K BIs through an antenna in a respective sending group of the K sending groups, wherein a sending group used in any BI of the K BIs is different from a sending group used in another BI of the K BIs.

12. The apparatus according to claim 10, wherein:
the RSS process comprises K subphases, the M antennas are classified into K receiving groups, each of the K receiving groups comprises an antenna, and a first receiving group of the K receiving groups comprises two antennas; and
the instructions for receiving the second SSW frames comprise further instructions for:
receiving each of the second SSW frames in a respective subphase through an antenna in a respective one of the K receiving groups, wherein a receiving group of the K receiving groups used in any subphase of the K subphases is different from a receiving group of the K receiving group used in another subphase of the K subphases, and each of the second SSW frames is sent by the responder in the different sector directions in the K subphases.

13. The apparatus according to claim 12, wherein the ISS process spans beacon transmission intervals (BTIs) of K beacon intervals (BIs).

14. The apparatus according to claim 13, wherein the K subphases span association beamforming training (A-BFT) periods of the K BIs, and antennas used in a BTI and an A-BFT period of a same BI of the K BIs overlap and are not switched.

15. The apparatus according to claim 10, wherein:
in a same beacon transmission interval (BTI), a plurality of antennas used by the apparatus share a same antenna identifier; or
in a same BTI, the plurality of antennas use antenna identifiers of the plurality of antennas.

16. The apparatus according to claim 10, wherein the instructions comprise further instructions for:
perform multiple-input multiple-output (MIMO) transmission in a beacon interval (BI) through an antenna set comprising a primary antenna, wherein the primary antenna comprises an antenna that sends a SSW of the first SSW frames in a beacon transmission interval (BTI) of the BI.

17. The apparatus according to claim 10, wherein:
the apparatus has n radio frequency RF chains, n is a positive integer greater than 1, and a connection relationship between the N antennas and the n RF chains is capable of being dynamically configured; and
when a target RF chain of the n RF chains switches to a different antenna to send the first SSW frames, sending the first SSW frames comprises:
sending, by the target RF chain, a first SSW frame of the first SSW frames through a first antenna;
sending, by a second antenna connected to a second RF chain different from the target RF chain, a second SSW frame of the first SSW frames after waiting for a short beamforming interframe space (SBIFS);
switching and connecting, by the target RF chain, to a third antenna while the second antenna sends the second SSW frame of the first SSW frames; and
after the second antenna sends the second SSW frame of the first SSW frames, sending, by the third antenna connected to the target RF chain, a third SSW frame of the first SSW frames after waiting for the SBIFS.

18. An apparatus, comprising:
a processor; and
a non-transitory computer-readable storage medium storing a program to be executed by the processor, the program including instructions for:
performing an initiator sector sweep (ISS) process, wherein the ISS process comprises omnidirectionally receiving first Sector Sweep (SSW) frames, wherein the first SSW frames are sent, by an initiator, in different sector directions sequentially through m antennas, the different sector directions correspond to different beams, $1 \leq m \leq N$, and N is a quantity of antennas of the initiator;
determining a best SSW frame of the first SSW frames with a best quality in the ISS process and an optimal antenna of the apparatus; and
performing a responder sector sweep (RSS) process, wherein the RSS process comprises sending second SSW frames in different sector directions through the optimal antenna, wherein the second SSW frame carries information indicating the best SSW frame, and the best SSW frame is further used by the initiator to determine an optimal transmit beam in the ISS process, and the second SSW frames are received in a parallel omnidirectional manner by the initiator through M antennas.

\* \* \* \* \*